US008382230B2

(12) United States Patent
Furukawa

(10) Patent No.: US 8,382,230 B2
(45) Date of Patent: Feb. 26, 2013

(54) IMAGE FORMING APPARATUS AND IMAGE FORMING METHOD

(75) Inventor: Koji Furukawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 410 days.

(21) Appl. No.: 12/719,404

(22) Filed: Mar. 8, 2010

(65) Prior Publication Data

US 2010/0225697 A1 Sep. 9, 2010

(30) Foreign Application Priority Data

Mar. 9, 2009 (JP) ................................ 2009-055621

(51) Int. Cl.
*B41J 29/38* (2006.01)
*G01D 11/00* (2006.01)

(52) U.S. Cl. ............................ 347/17; 347/96; 347/100

(58) Field of Classification Search .................. 347/100, 347/95, 96, 101, 102, 21, 20, 9, 17, 19, 15, 347/14, 5; 106/31.6, 31.13, 31.27; 523/160, 523/161
See application file for complete search history.

(56) References Cited

U.S. PATENT DOCUMENTS

| | | | | |
|---|---|---|---|---|
| 6,357,871 | B1 | 3/2002 | Ashida et al. | |
| 2008/0143785 | A1 | 6/2008 | Houjou | |
| 2009/0244235 | A1 | 10/2009 | Houjou | |
| 2010/0006260 | A1* | 1/2010 | Oh et al. | 165/80.2 |
| 2010/0196604 | A1* | 8/2010 | Kariya et al. | 427/288 |
| 2010/0203247 | A1* | 8/2010 | Kariya et al. | 427/256 |

FOREIGN PATENT DOCUMENTS

| | | | |
|---|---|---|---|
| EP | 1 428 667 | A2 | 6/2004 |
| EP | 2 105 317 | A1 | 9/2009 |
| JP | 3-160068 | A | 7/1991 |
| JP | 8-283636 | A | 10/1996 |
| JP | 2003-54116 | A | 2/2003 |

OTHER PUBLICATIONS

European Search report issued Jun. 22, 2010 in corresponding European application No. 10002395.1-1251.

* cited by examiner

*Primary Examiner* — Manish S Shah
(74) *Attorney, Agent, or Firm* — Birch, Stewart, Kolasch & Birch, LLP

(57) ABSTRACT

An image forming apparatus includes: a printing device which forms an image on a recording medium using ink containing at least pigment, a water-soluble organic solvent, resin particles and water; and a fixing device which makes contact with a surface of the recording medium on which the image is formed and applies heat and pressure to fix the image, wherein a minimum filming temperature) ($MFT^0$) of an aqueous dispersion of the resin particles is 60° C. or above, and higher than a minimum filming temperature ($MFT^{25}$) of a dispersion of the resin particles in a mixed liquid combining a water-soluble organic solvent at 25 weight % with respect to the resin particles, and water; and wherein the image forming apparatus further includes a controller which controls temperature of the recording medium in such a manner that, when the temperature of the recording medium in the fixing device is represented by T, the minimum filming temperature ($MFT^{25}$) of mixed liquid dispersion of the resin particles satisfies $MFT^{25} \leqq T \leqq MFT^{25}+50$ (° C.), and a coating layer is formed on the recording medium, then the temperature of the recording medium is adjusted to or below a temperature at which a coating layer is not broken down.

19 Claims, 8 Drawing Sheets

FIG.5A

| | INK | | | | DEPOSITION OF TREATMENT LIQUID | FIXING TEMPERATURE : $MFT^{25}-10$ (°C) | | | | FIXING TEMPERATURE : $MFT^{25}\pm0$ (°C) | | | | FIXING TEMPERATURE : $MFT^{25}+10$ (°C) | | | |
|---|---|---|---|---|---|---|---|---|---|---|---|---|---|---|---|---|---|
| | ORGANIC SOLVENT | RESIN PARTICLES | $MFT^0$ (°C) | $MFT^{25}$ (°C) | | ROLLER OFFSET | WEAR RESISTANCE | BLOCKING | PRACTICAL EXAMPLE/ COMPARATIVE EXAMPLE | ROLLER OFFSET | WEAR RESISTANCE | BLOCKING | PRACTICAL EXAMPLE/ COMPARATIVE EXAMPLE | ROLLER OFFSET | WEAR RESISTANCE | BLOCKING | PRACTICAL EXAMPLE/ COMPARATIVE EXAMPLE |
| EXPERIMENT EXAMPLE 1-1 | GP250 (10) TPGmME (6) | A-02 | 106 | 65 | YES | B | C | B | COMPARATIVE EXAMPLE | A | B | B | PRACTICAL EXAMPLE | A | A | A | PRACTICAL EXAMPLE |
| 2-1 | GP250 (10) TPGmME (6) | A-03 | 100 | 56 | YES | B | C | B | | A | B | B | | A | A | A | |
| 3-1 | TPGmME (16) | A-01 | 110 | 25 | YES | B | C | B | | A | B | B | | A | A | B | |
| 4-1 | GP400 (10) TEGmBE (6) | A-01 | 110 | 41 | YES | B | C | B | | A | B | B | | A | A | A | |
| 5-1 | GP250 (10) TPGmME (6) | A-02 | 106 | 65 | YES | B | C | B | | A | B | B | | A | A | A | |
| 6-1 | GP250 (10) TPGmME (6) | A-02 | 106 | 65 | YES | B | C | B | | A | B | B | | A | A | A | |
| 7-1 | TPGmME (16) | B-01 | 75 | 20 | YES | B | C | B | | A | B | B | | A | A | B | |
| 8-1 | TPGmME (16) | B-03 | 65 | 12 | YES | B | C | B | | A | B | B | | A | A | B | |
| 9-1 | GP250 (16) | A-01 | 110 | 88 | YES | B | C | B | | A | B | B | | B | B | B | |
| 10-1 | GP250 (10) TPGmME (6) | A-01 | 110 | 75 | YES | B | C | B | | A | B | B | | B | B | B | |
| 11-1 | GP250 (10) TPGmME (6) | A-02 | 106 | 65 | NO | B | C | B | | B | B | B | | B | B | B | |
| 12-1 | GP250 (10) TPGmME (6) | B-02 | 55 | 10 | YES | B | C | C | | A | B | C | COMPARATIVE EXAMPLE | A | A | C | COMPARATIVE EXAMPLE |

FIG.5B

| EXPERIMENT EXAMPLE | INK: ORGANIC SOLVENT | INK: RESIN PARTICLES | INK: $MFT^0$ (°C) | INK: $MFT^{25}$ (°C) | DEPOSITION OF TREATMENT LIQUID | FIXING TEMPERATURE: $MFT^{25}$ + 30 (°C): ROLLER OFFSET | WEAR RESISTANCE | BLOCKING | PRACTICAL EXAMPLE/ COMPARATIVE EXAMPLE | FIXING TEMPERATURE: $MFT^{25}$ + 50 (°C): ROLLER OFFSET | WEAR RESISTANCE | BLOCKING | PRACTICAL EXAMPLE/ COMPARATIVE EXAMPLE | FIXING TEMPERATURE: $MFT^{25}$ + 60 (°C): ROLLER OFFSET | WEAR RESISTANCE | BLOCKING | PRACTICAL EXAMPLE/ COMPARATIVE EXAMPLE |
|---|---|---|---|---|---|---|---|---|---|---|---|---|---|---|---|---|---|
| 1-1 | GP250(10) TPGmME(6) | A-02 | 106 | 65 | YES | A | A | A | PRACTICAL EXAMPLE | B | B | B | PRACTICAL EXAMPLE | C | C | B | COMPARATIVE EXAMPLE |
| 2-1 | GP250(10) TPGmME(6) | A-03 | 100 | 56 | YES | A | A | A | | B | B | B | | C | C | B | |
| 3-1 | TPGmME(16) | A-01 | 110 | 25 | YES | A | A | B | | B | B | B | | C | C | B | |
| 4-1 | GP400(10) TEGmBE(6) | A-01 | 110 | 41 | YES | A | A | A | | B | B | B | | C | C | B | |
| 5-1 | GP250(10) TPGmME(6) | A-02 | 106 | 65 | YES | A | A | A | | B | B | B | | C | C | B | |
| 6-1 | GP250(10) TPGmME(6) | A-02 | 106 | 65 | YES | A | A | A | | B | B | B | | C | C | B | |
| 7-1 | TPGmME(16) | B-01 | 75 | 20 | YES | A | A | B | | B | B | B | | C | C | B | |
| 8-1 | TPGmME(16) | B-03 | 65 | 12 | YES | A | A | B | | B | B | B | | C | C | B | |
| 9-1 | GP250(16) | A-01 | 110 | 88 | YES | A | A | B | | B | B | B | | C | C | B | |
| 10-1 | GP250(10) TPGmME(6) | A-01 | 110 | 75 | YES | A | A | B | | B | B | B | | C | C | B | |
| 11-1 | GP250(10) TPGmME(6) | A-02 | 106 | 65 | NO | B | B | B | | B | B | B | | C | C | B | |
| 12-1 | GP250(10) TPGmME(6) | B-02 | 55 | 10 | YES | A | A | C | COMPARATIVE EXAMPLE | B | B | C | COMPARATIVE EXAMPLE | C | C | C | |

FIG.6A

| | INK | | | | DEPOSITION OF TREATMENT LIQUID | FIXING TEMPERATURE : $MFT^{25} - 10$ (°C) | | | | FIXING TEMPERATURE : $MFT^{25} \pm 0$ (°C) | | | | FIXING TEMPERATURE : $MFT^{25} + 10$ (°C) | | | |
|---|---|---|---|---|---|---|---|---|---|---|---|---|---|---|---|---|---|
| EXPERIMENT EXAMPLE | ORGANIC SOLVENT | RESIN PARTICLES | $MFT^{0}$ (°C) | $MFT^{25}$ (°C) | | ROLLER OFFSET | WEAR RESISTANCE | BLOCKING | PRACTICAL EXAMPLE/ COMPARATIVE EXAMPLE | ROLLER OFFSET | WEAR RESISTANCE | BLOCKING | PRACTICAL EXAMPLE/ COMPARATIVE EXAMPLE | ROLLER OFFSET | WEAR RESISTANCE | BLOCKING | PRACTICAL EXAMPLE/ COMPARATIVE EXAMPLE |
| 1-2 | GP250 (10) TPGmME (6) | A-02 | 106 | 65 | YES | B | C | B | COMPARATIVE EXAMPLE | A | B | B | PRACTICAL EXAMPLE | A | A | A | PRACTICAL EXAMPLE |
| 2-2 | GP250 (10) TPGmME (6) | A-03 | 100 | 56 | YES | B | C | B | | A | B | B | | A | A | A | |
| 3-2 | TPGmME (16) | A-01 | 110 | 25 | YES | B | C | B | | A | B | B | | A | A | B | |
| 4-2 | GP400 (10) TEGmBE (6) | A-01 | 110 | 41 | YES | B | C | B | | A | B | B | | A | A | A | |
| 5-2 | GP250 (10) TPGmME (6) | A-02 | 106 | 65 | YES | B | C | B | | A | B | B | | A | A | A | |
| 6-2 | GP250 (10) TPGmME (6) | A-02 | 106 | 65 | YES | B | C | B | | A | B | B | | A | A | A | |
| 7-2 | TPGmME (16) | B-01 | 75 | 20 | YES | B | C | B | | A | B | B | | A | A | B | |
| 8-2 | TPGmME (16) | B-03 | 65 | 12 | YES | B | C | B | | A | B | B | | A | A | B | |
| 9-2 | GP250 (16) | A-01 | 110 | 88 | YES | B | C | B | | A | B | B | | B | B | B | |
| 10-2 | GP250 (10) TPGmME (6) | A-01 | 110 | 75 | YES | B | C | B | | A | B | B | | B | B | B | |
| 11-2 | GP250 (10) TPGmME (6) | A-02 | 106 | 65 | NO | B | C | B | | B | B | B | | B | B | B | |
| 12-2 | GP250 (10) TPGmME (6) | B-02 | 55 | 10 | YES | B | C | C | | A | B | C | COMPARATIVE EXAMPLE | A | A | C | COMPARATIVE EXAMPLE |

FIG.6B

| EXPERIMENT EXAMPLE | INK: ORGANIC SOLVENT | INK: RESIN PARTICLES | INK: $MFT^0$ (°C) | INK: $MFT^{25}$ (°C) | DEPOSITION OF TREATMENT LIQUID | FIXING TEMPERATURE : $MFT^{25}$ + 30 (°C): ROLLER OFFSET | WEAR RESISTANCE | BLOCKING | PRACTICAL EXAMPLE/ COMPARATIVE EXAMPLE | FIXING TEMPERATURE : $MFT^{25}$ + 50 (°C): ROLLER OFFSET | WEAR RESISTANCE | BLOCKING | PRACTICAL EXAMPLE/ COMPARATIVE EXAMPLE | FIXING TEMPERATURE : $MFT^{25}$ + 60 (°C): ROLLER OFFSET | WEAR RESISTANCE | BLOCKING | PRACTICAL EXAMPLE/ COMPARATIVE EXAMPLE |
|---|---|---|---|---|---|---|---|---|---|---|---|---|---|---|---|---|---|
| 1-2 | GP250 (10) TPGmME (6) | A-02 | 106 | 65 | YES | A | A | A | PRACTICAL EXAMPLE | C | C | B | COMPARATIVE EXAMPLE | C | C | B | COMPARATIVE EXAMPLE |
| 2-2 | GP250 (10) TPGmME (6) | A-03 | 100 | 56 | YES | A | A | A | | C | C | B | | C | C | B | |
| 3-2 | TPGmME (16) | A-01 | 110 | 25 | YES | A | A | B | | B | B | B | PRACTICAL EXAMPLE | C | C | B | |
| 4-2 | GP400 (10) TEGmBE (6) | A-01 | 110 | 41 | YES | A | A | A | | B | B | B | | C | C | B | |
| 5-2 | GP250 (10) TPGmME (6) | A-02 | 106 | 65 | YES | A | A | A | | C | C | B | COMPARATIVE EXAMPLE | C | C | B | |
| 6-2 | GP250 (10) TPGmME (6) | A-02 | 106 | 65 | YES | A | A | A | | C | C | B | | C | C | B | |
| 7-2 | TPGmME (16) | B-01 | 75 | 20 | YES | A | A | B | | B | B | B | PRACTICAL EXAMPLE | C | C | B | |
| 8-2 | TPGmME (16) | B-03 | 65 | 12 | YES | A | A | B | | B | B | B | | C | C | B | |
| 9-2 | GP250 (16) | A-01 | 110 | 88 | YES | C | C | B | COMPARATIVE EXAMPLE | C | C | B | COMPARATIVE EXAMPLE | C | C | B | |
| 10-2 | GP250 (10) TPGmME (6) | A-01 | 110 | 75 | YES | C | C | B | | C | C | B | | C | C | B | |
| 11-2 | GP250 (10) TPGmME (6) | A-02 | 106 | 65 | NO | B | B | B | PRACTICAL EXAMPLE | C | C | B | | C | C | B | |
| 12-2 | GP250 (10) TPGmME (6) | B-02 | 55 | 10 | YES | A | A | C | COMPARATIVE EXAMPLE | B | B | C | | C | C | C | |

IMAGE FORMING APPARATUS AND IMAGE FORMING METHOD

BACKGROUND OF THE INVENTION

1. Field of the Invention

The present invention relates to an image forming apparatus and an image forming method, and more particularly, to an image forming apparatus and image forming method by which an image can be fixed satisfactorily to a recording medium and the strength of a formed image can be improved.

2. Description of the Related Art

An inkjet recording apparatus forms an image on a recording medium by successively depositing droplets of ink onto the recording medium. The inkjet recording apparatus is able to record images of good quality by means of a simple composition, and therefore such apparatuses are widely used as domestic printers for individual use and office printers for commercial use. In the case of office printers for commercial use, in particular, there are increasing demands for higher processing speed and higher image quality.

An inkjet recording apparatus forms an image on a recording medium using ink and fixes the image onto the recording medium by drying and then melts resin particles contained in the ink so that the ink forms a film. A known fixing device for fixing an image on a recording medium is an apparatus which fixes a formed image on a recording medium by the action of heat and pressure, by holding and conveying a recording medium on which an image has been formed using a heater, a fixing roller, a conveyance drum, and the like.

However, if the heating temperature during fixing is high, then an offset effect occurs in which a portion of the ink is transferred to (adheres to) the fixing roller. This offset effect causes problems in that, when recording in a continuous fashion, the ink is transferred again onto the non-image portion (non-recording portion) of the next recording medium and therefore a satisfactory printed item cannot be obtained.

In order to solve problems of offset such as this, the minimum filming temperature (also abbreviated as "MFT" below) of the resin particles contained in the ink is an important factor. By carrying out fixing at a temperature equal to or higher than this minimum filming temperature, the resin particles are melted and image fixing can be performed.

As an apparatus or method which forms images by specifying the minimum filming temperature, Japanese Patent Application Publication No. 3-160068 discloses, for example, an inkjet or ink mist recording method which uses an ink having a minimum filming temperature of 40° C. or higher. Furthermore, Japanese Patent Application Publication No. 8-283636 discloses a recording method comprising at least a first step of fixing a printed item by means of a platen heated to at least the MFT of a low-MFT resin emulsion having an MFT of 60° C. to 100° C., using ink containing the low-MFT resin emulsion and a high-Tg resin emulsion having a Tg (glass transition temperature) of 140° C. to 200° C., and a second step of carrying out repeat fixing of the printed item by further heating outside the recording apparatus.

However, the ink described in Japanese Patent Application Publication No. 3-160068 specifies the MFT temperature in order to improve nozzle blockages and storage stability, and provides no investigation with respect to fixing conditions. Furthermore, the recording method described in Japanese Patent Application Publication No. 8-283636 discloses a recording method in which fixing is carried out by heating at least to the MFT of the resin emulsion contained in the ink, but this MFT is the MFT when dispersed in water and no investigation is made in respect of the MFT and fixing conditions in a solvent composition which is close to a dry state. Furthermore, since an image is fixed by heating a recording medium from the rear surface, there have been no problems of the occurrence of offset due to excessively high heating temperature during fixing.

Conversely, if the MFT temperature is low, then the resin emulsion is molten at room temperature, and when recording media on which images have been formed are stacked upon each other, the problems of image peeling and transfer of color to other recording media (blocking) also arise and it has been difficult to obtain images of high quality.

SUMMARY OF THE INVENTION

The present invention has been contrived in view of these circumstances, an object thereof being to prevent fixing offset and blocking, and to strengthen a formed image, by improving wear resistance, and the like, as well as lowering the fixing temperature.

In order to attain an object described above, one aspect of the present invention is directed to an image forming apparatus, comprising: a printing device which forms an image on a recording medium using ink containing at least pigment, a water-soluble organic solvent, resin particles and water; and a fixing device which makes contact with a surface of the recording medium on which the image is formed and applies heat and pressure to fix the image, wherein a minimum filming temperature ($MFT^0$) of an aqueous dispersion of the resin particles is 60° C. or above, and higher than a minimum filming temperature ($MFT^{25}$) of a dispersion of the resin particles in a mixed liquid combining a water-soluble organic solvent at 25 weight % with respect to the resin particles, and water; and wherein the image forming apparatus further comprises a controller which controls temperature of the recording medium in such a manner that, when the temperature of the recording medium in the fixing device is represented by T, the minimum filming temperature ($MFT^{25}$) of mixed liquid dispersion of the resin particles satisfies $MFT^{25} \leqq T \leqq MFT^{25}+50$ (° C.), and a coating layer is formed on the recording medium, then the temperature of the recording medium is adjusted to or below a temperature at which a coating layer is not broken down.

By adjusting the water and the water-soluble organic solvent contained in the ink, it is possible to lower the minimum filming temperature of the resin particles. According to this aspect, since the type and amount of water-soluble organic solvent are specified in such a manner that $MFT^{25}$ is lower than $MFT^0$, then it is possible to carry out fixing at a low temperature during fixing after printing by means of ink. In the related art, fixing is carried out by specifying the heating temperature on the basis of MFT, but by specifying the fixing temperature on the basis of the MFT value in a solvent composition which is close to a dry state including the water-soluble organic solvent, as in the present invention, then it is possible to carry out fixing at a suitable fixing temperature. Consequently, it is possible to prevent the fixing temperature from becoming too high, and therefore offset can be prevented and a good image can be formed.

Furthermore, since $MFT^0$ is equal to or higher than 60° C., then it is possible to suppress stickiness of the image after recording, as well as suppressing blocking (adherence, or the like) which occurs when a sheet of paper, or the like, is superimposed on top of the image portion.

Moreover, if the temperature T of the recording medium during fixing is $MFT^{25} \leqq T \leqq MFT^{25}+50$ (° C.) and if a coating layer is formed on the recording medium, then fixing is carried out at or below a temperature whereby the coating layer is not broken down. By setting the temperature T of the recording medium to the range described above, it is also possible to suppress offset and to form an image having excellent wear resistance. If the temperature T is lower than $MFT^{25}$, then the resin particles do not melt, and therefore the pigment does not form a resin film and resistance to wear is not obtained. Conversely, if the temperature T is higher than $MFT^{25}+50$ (° C.), then the heating temperature becomes high and offset occurs. Furthermore, if fixing is carried out at or above a temperature at which the coating layer is broken down, then the coating layer of the recording medium and the image is broken down and therefore offset and wear resistance decline.

In the present invention, "$MFT^{0}$" is the minimum filming temperature when the resin particles used in the aqueous ink are dispersed in water and the aqueous dispersion thus obtained is adjusted to a 25 wt % liquid. Furthermore, "$MFT^{25}$" is the minimum filming temperature when the resin particles used in the aqueous ink are adjusted to a 25 wt % liquid, and then mixed with a combined liquid comprising water-soluble organic solvent at 25 wt % with respect to the solid content of the resin particles, and water.

Desirably, the recording medium is a coated paper having a coating layer containing micro-particles in a hydrophilic binder on at least one surface of the paper; and the controller controls the temperature of the recording medium in such a manner that the temperature T of the recording medium in the fixing device satisfies $T<100$ (° C.).

If coated paper is used as the recording medium and the temperature T of the recording medium during fixing exceeds 100° C., then the water content in the recording medium (coated paper) evaporates off suddenly, the image portion and the coating layer of the coated paper itself are broken down, and roller offset occurs, as well as decline in wear resistance. Furthermore, since indentations occur in the recording medium as a result of change in the water content of the recording medium, it is desirable to set the fixing temperature below 100° C. if a coated paper is used as the recording medium.

Desirably, the printing device uses droplet ejection by an inkjet.

In this aspect of the invention, it is suitable to use an inkjet method as the printing device.

Desirably, the image forming apparatus further comprises a drying device which dries the ink, on a downstream side of the printing device in terms of a direction of conveyance of the recording medium.

According to this aspect, since the water content in the ink can be reduced by providing a drying device which dries the ink, the density of the water-soluble organic solvent in the solvent is increased, and therefore it is possible to reduce the minimum filming temperature of the resin particles and image fixing can be carried out at a low temperature.

Desirably, the image forming apparatus further comprises a water content measurement device which measures a water content of the ink ejected as droplets onto the recording medium, on a downstream side of the drying device in terms of the direction of conveyance of the recording medium, wherein the controller adjusts heating temperature in accordance with the water content.

According to this aspect, since the water content is measured after drying and the heating temperature of the fixing device is controlled in accordance with this water content, then it is possible to carry out fixing at an optimal temperature in such a manner that an image having excellent wear resistance and suppression of roller offset can be formed.

Desirably, the image forming apparatus further comprises: a treatment liquid deposition device which deposits treatment liquid containing a component that reacts with the pigment contained in the ink, onto the recording medium on an upstream side of the printing device in terms of the direction of conveyance of the recording medium; and a treatment liquid drying device which dries a solvent of the treatment liquid which has been deposited onto the recording medium.

According to this aspect, since treatment liquid containing a component that reacts with the pigment in the ink is deposited before ejecting droplets of ink, it is possible to prevent bleeding of the ink.

Desirably, a content of the water-soluble organic solvent is equal to or greater than 5 wt % and equal to or less than 30 wt % in the ink.

According to this aspect, by setting the content of the water-soluble organic solvent in the ink to the range described above, it is possible to reduce the MFT during actual fixing, and fixing can be carried out at a low temperature.

Desirably, the water-soluble organic solvent is one type selected from alkylene oxy alcohol and alkylene oxyalkyl ether.

This aspect specifies a desirable type of water-soluble organic solvent, and from the viewpoint of applying a differential between $MFT^{0}$ and $MFT^{25}$ and raising the value of $MFT^{25}$, it is desirable to use water-soluble organic solvents of the types described above.

Desirably, a vapor pressure of the water-soluble organic solvent is lower than a vapor pressure of water.

According to this aspect, by making the vapor pressure of the water-soluble organic solvent lower than the vapor pressure of water, the composition of the ink solution ejected as droplets onto the recording medium contains a higher density of water-soluble organic solvent. Consequently, it is possible to lower the fixing temperature.

In order to attain an object described above, another aspect of the present invention is directed to an image forming method, comprising: an ink printing step of forming an image on a recording medium, using ink containing at least pigment, a water-soluble organic solvent, resin particles and water; and a fixing step of making contact with a surface of the recording medium on which the image is formed and applies heat and pressure to fix the image, wherein a minimum filming temperature ($MFT^{0}$) of an aqueous dispersion of the resin particles is 60° C. or above, and higher than a minimum filming temperature ($MFT^{25}$) of a dispersion of the resin particles in a mixed liquid combining a water-soluble organic solvent at 25 weight % with respect to the resin particles, and water; and temperature of the recording medium is controlled in such a manner that, when the temperature of the recording medium in the fixing device is represented by T, the minimum filming temperature ($MFT^{25}$) of mixed liquid dispersion of the resin particles satisfies $MFT^{25} \leqq T \leqq MFT^{25}+50$ (° C.), and a coating layer is formed on the recording medium, then the temperature of the recording medium is adjusted to or below a temperature at which a coating layer is not broken down.

Desirably, the recording medium is a coated paper having a coating layer containing micro-particles in a hydrophilic binder on at least one surface of the paper; and the temperature of the recording medium is controlled in such a manner that the temperature T of the recording medium in the fixing step satisfies $T<100$ (° C.).

Desirably, the printing step uses droplet ejection by an inkjet.

Desirably, the image forming method comprises a drying step of drying the ink after the printing step.

Desirably, the image forming method comprises a water content measurement step of measuring a water content of the ink ejected as droplets onto the recording medium after the drying step, wherein heating temperature in the fixing step is controlled in accordance with the water content.

Desirably, the image forming method further comprises: a treatment liquid deposition step of depositing treatment liquid containing a component that reacts with the pigment contained in the ink, onto the recording medium, before the printing step; and a treatment liquid drying step of drying a solvent in the treatment liquid which has been deposited onto the recording medium.

These aspects develop aspects of the invention relating to an image forming apparatus, as an image forming method, and beneficial effects similar to those of an image forming apparatus can be obtained.

According to an image forming apparatus and an image forming method of the present invention, the MFT in a solvent component close to the state during fixing is envisaged, and the heating temperature of the fixing device is specified by using a solvent composition whereby this MFT value is reduced. Consequently, even if the heating temperature during fixing is lowered, it is still possible to improve the film strength of the image portion, such as the wear resistance, as well as being able to adjust fixing to a suitable fixing temperature by envisaging the MFT value in a solvent composition close to the state during fixing, and therefore it is possible to suppress roller offset also. Furthermore, by making $MFT^0$ equal to or greater than a desired temperature and higher than $MFT^{25}$, it is possible to lower the fixing temperature and since MFT can be raised during storage, then blocking can be suppressed.

BRIEF DESCRIPTION OF THE DRAWINGS

FIGS. 5A and 5B are tables showing the results of practical examples; and FIGS. 6A and 6B are tables showing the results of practical examples.

DESCRIPTION OF THE PREFERRED EMBODIMENTS

Figure 1:
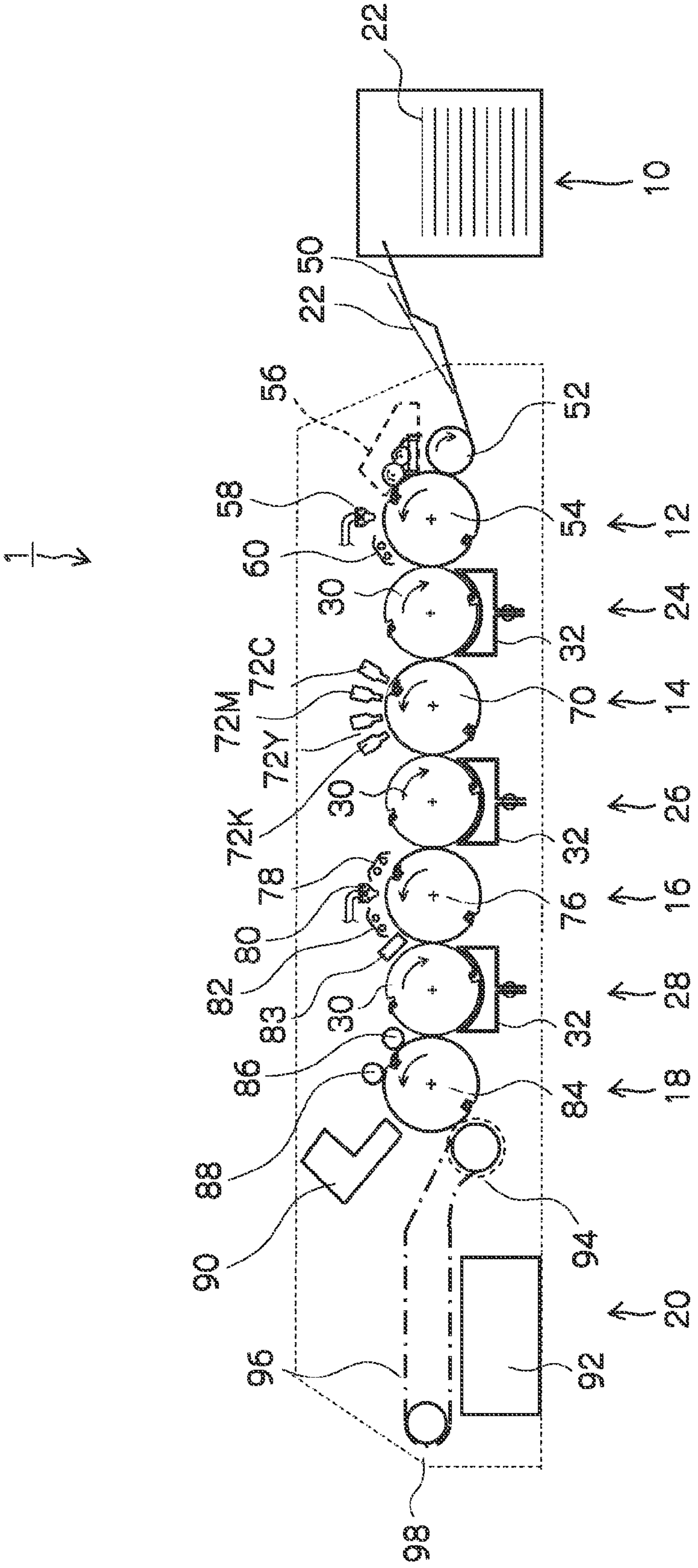
FIG. 1 is an approximate schematic drawing of an inkjet recording apparatus which is one example of an image forming apparatus relating to an embodiment of the invention.

Below, preferred embodiments of an image forming apparatus and an image forming method relating to the present invention are described in detail in accordance with the accompanying drawings.

Ink

Firstly, the aqueous ink which can be used in the present embodiment of the invention will be described in detail. The aqueous ink includes at least a resin dispersant (A), a pigment (B) which is dispersed by the resin dispersant (A), self-dispersing polymer micro-particles (resin particles) (C), an aqueous liquid medium (water-soluble organic solvent) (D), and water (E).

Resin dispersant (A)

The resin dispersant (A) is used as a dispersant for the pigment (B) in the aqueous liquid medium (D), and any resin may be used provided that it is capable of dispersing the pigment (B), but the structure of the resin dispersant (A) desirably has a hydrophobic structural unit (a) and hydrophilic structural unit (b). According to requirements, the resin dispersant (A) may include a structural unit (c) which is different to the hydrophobic structural unit (a) and the hydrophilic structural unit (b).

The composition of the hydrophilic structural unit (b) and the hydrophobic structural unit (a) depends on the degrees of hydrophilic and hydrophobic properties of them, and desirably the hydrophobic structural unit (a) is contained at a rate exceeding 80 wt %, and more desirably, 85 wt % or more, with respect to the total weight of the resin dispersant (A). In other words, the content of the hydrophilic structural unit (b) must be equal to or lower than 15 wt %, and if the content of the hydrophilic structural unit (b) is greater than 15 wt %, then the component that does not contribute to the dispersion of pigment but simply dissolves in the aqueous liquid medium (D) becomes greater, the properties, such as dispersion of the pigment (B), become worse, and this causes the ejection properties of the inkjet recording ink to deteriorate.

Ratio of Pigment (B) and Resin Dispersant (A)

The ratio of the pigment (B) and the resin dispersant (A) is desirably 100:25 to 100:140 by weight ratio, and more desirably, 100:25 to 100:50. If the resin dispersant is 100:25 or higher, then the dispersion stability and the wear resistance tend to improve. If the resin dispersant is 100:140 or lower, then the dispersion stability tends to improve.

Pigment (B)

In the present embodiment of the invention, pigment (B) is a general term for a colored material (including a white color in the case of an inorganic pigment) which is virtually insoluble in water or organic solvent, as described on page 518 of *Kagaku Daijiten* (Encyclopaedia of Chemistry) Vol. 3, published Apr. 1, 1994 (Michinori Ooki, et. al., eds.), and in the present embodiment of the invention, it is possible to use an organic pigment or an inorganic pigment.

Furthermore, in the present embodiment of the invention, the "pigment (B) dispersed by the resin dispersant (A)" means a pigment which is held in dispersion by the resin dispersant (A), and desirably, the pigment used is held in dispersion in the aqueous liquid medium (D) by the resin dispersant (A). Furthermore, a dispersant may or may not be included in the aqueous liquid medium (D).

Possible examples of the pigment are: azo lake, azo pigment, a phthalocyanine pigment, a perylene pigment and perynone pigment, anthraquinone pigment, quinacridone pigment, dioxazine pigment, diketo-pyrrolo-pyrrole pigment, thio indigo pigment, isoindolinone pigment, quinophthalone pigment, or other polycyclic pigments, organic pigments, such as a basic dye chelate, an acidic dye chelate, or the like, nitro pigment, nitroso pigment, aniline black, daylight fluorescent pigment, or the like, or inorganic pigments, such as titanium oxide, an iron oxide, carbon black, or the like. Furthermore, if the pigment is one described in the color index, then provided that the pigment can be dispersed in a water phase, any pigment can be used. Moreover, it is also possible to use a pigment which has been subjected to surface treatment with a surfactant or polymer dispersant, or the like, or grafted carbon.

Of the pigments described above, it is especially desirable to use: an azo pigment, a phthalocyanine pigment, an anthraquinone pigment, a quinacridone pigment, or carbon black pigment.

The pigments may be used independently, or two or more types of pigment may be used in combination. From the viewpoint of image density, the content of pigment in the aqueous ink composition is desirably 1 to 25 wt % with respect to the total solid content of the aqueous ink composition, and more desirably, 2 to 20 wt %, even more desirably, 5 to 20 wt % and particularly desirably, 5 to 15 wt %.

Self-Dispersing Polymer Micro-Particles (Resin Particles) (C)

The aqueous ink contains at least one type of resin particles having an $MFT^0$ (minimum filming temperature when dispersed in water) of 60° C. or above, and an $MFT^0$ which is higher than the minimum filming temperature ($MFT^{25}$) when dispersed in a mixed liquid combining water and water-soluble organic solvent at 25 wt % with respect to the resin particles. By containing resin particles of this kind, when fixing while suppressing the occurrence of blocking, it is possible to lower the temperature of the recording medium and therefore the occurrence of roller offset can be suppressed.

The self-dispersing polymer micro-particles (C) according to the present embodiment invention means a water-insoluble polymer which can assume a dispersed state in an aqueous medium by means of a functional group (in particular, an acidic group or salt of same) belonging to the pr resin itself, in the absence of other surfactants, and which does not contain an isolated (free) emulsifier.

Here, a dispersed state includes both an emulsified state (emulsion) where water-insoluble polymer is dispersed in a liquid state in an aqueous medium, and a dispersed state (suspension) where water-insoluble polymer is dispersed in a solid state in an aqueous medium.

In the water-insoluble polymer according to the present embodiment of the invention, from the viewpoint of the ink aggregation speed and the ink fixing properties when the polymer is included in an aqueous ink, it is desirable to use a water-insoluble polymer which can assume a dispersed state in which the water-insoluble polymer is dispersed in a solid state.

The self-dispersing polymer micro-particles in the present embodiment of the invention include a constituent unit originating in a (meth)acrylate monomer containing an aromatic group, and desirably the content thereof is 10 wt % to 95 wt %. By setting the content of the (meth)acrylate monomer containing an aromatic group in the range of 10 wt % to 95 wt %, the stability of the self-emulsified or dispersed state is improved, and increase in the viscosity of the ink is further suppressed.

In the present embodiment of the invention, from the viewpoint of the stability of the self-dispersed state, the stability of the particle shape in the aqueous medium due to the hydrophobic interaction between the aromatic rings, and reduction in the amount of water-soluble component by suitable hydrophobization of the particles, the content is desirably 15 wt % to 90 wt %, more desirably, 15 wt % to 80 wt %, and especially desirably, 25 wt % to 70 wt %.

The self-dispersing polymer micro-particles according to the present embodiment of the invention can be constituted by, for example, a constituent unit comprising a monomer containing an aromatic group and a constituent unit comprising a monomer including a dissociable group, but it may also include other constituent units, according to requirements.

The range of the molecular weight of the water-insoluble polymer which constitutes the self-dispersing polymer micro-particles according to the present embodiment of the invention is desirably between 3000 and 200,000, more desirably, between 5,000 and 150,000, and most desirably, between 10,000 to 100,000, in terms of the weight-average molecular weight. If the weight-average molecular weight is 3000 or above, then it is possible effectively to suppress the amount of the water-soluble component. Furthermore, by setting the weight-average molecular weight to 200,000 or less, it is possible to increase the self-dispersion stability. The weight-average molecular weight can be measured by gel permeation chromatography (GPC).

From the viewpoint of controlling the hydrophilic/hydrophobic properties of the polymer, more desirably, the water-soluble polymer constituting the self-dispersing polymer micro-particles according to the present embodiment of the invention includes a (meth)acrylate monomer containing an aromatic group at 15 to 90 wt % by copolymerisation ratio, and a monomer containing a carboxyl group and a monomer containing an alkyl group, the acid value being 25 to 100 and the weight-average molecular weight, 3000 to 200,000, and more desirably, includes a (meth)acrylate monomer containing an aromatic group at 15 to 80 wt % by copolymerisation ratio, and a monomer containing a carboxyl group and a monomer group containing an alkyl group, the acid value being 25 to 95 and the weight-average molecular weight being 5000 to 150,000.

The average particle size of the self-dispersing polymer micro-particles in the present embodiment of the invention is desirably in the range of 10 to 400 nm, more desirably, 10 to 200 nm, and even more desirably, 10 to 100 nm. By making the average particle size 10 nm or higher, manufacturability is improved. Furthermore, by making the average particle size equal to or lower than 400 nm, storage stability is improved.

Furthermore, there are no particular restrictions on the particle size distribution of the self-dispersing polymer micro-particles and they may have a broad particle size distribution or they may have a monodisperse particle size distribution. Moreover, it also possible to combine two or more types of water-insoluble particles.

The average particle size and the particle size distribution of the self-dispersing polymer micro-particles can be measured by using a light scattering method, for example.

The self-dispersing polymer micro-particles according to the present embodiment of the invention may be included suitably in an aqueous ink composition, and one type thereof may be used independently or two or more types thereof may be used in combination.

Aqueous Liquid Medium (Water-Soluble Organic Solvent) (D)

The aqueous ink includes at least one type of water-soluble organic solvent in which the $MFT^0$ of the resin particles is higher than $MFT^{25}$. By including a water-soluble liquid medium as well as the resin particles, it is possible to lower the heating temperature of the recording medium during fixing.

Since the ink includes water and an aqueous liquid medium, then by determining the heating temperature of the recording medium during fixing, with reference to $MFT^{25}$, it is possible to specify the temperature with reference to a state close to the actual fixing state. Furthermore, by making $MFT^0$ higher than $MFT^{25}$, the minimum filming temperature is low in the actual fixed state, and therefore it is possible to lower the heating temperature and roller offset can be prevented. Moreover, after fixing, the minimum filming temperature can be raised and therefore it is possible to prevent blocking.

In the present embodiment of the invention, as a method of achieving the relationship described above between $MFT^0$ and $MFT^{25}$, it is possible to manufacture the ink composition by appropriately selecting the type and weight range of the water-soluble organic solvent included in the ink composition.

From the viewpoint of preparing water-soluble organic solvent constituting the ink composition so that $MFT^{25}$ is lowered and the temperature differential from $MFT^{0}$ ($MFT^{0}-MFT^{25}$) is in the range of 50° C. or above, alkylene oxy alcohol and alkylene oxyalkyl ether are desirable. Furthermore, for similar reasons, the ink composition desirably contains two or more types of water-soluble organic solvent, and if the ink composition contains two or more types of water-soluble organic solvent, desirably, at least one of these is alkylene oxy alcohol, and furthermore, especially desirably, the ink composition contains two or more types of water-soluble organic solvent including at least one type of alkylene oxy alcohol and at least one type of alkylene oxyalkyl ether.

The alkylene oxy alcohol is desirably a propylene oxy alcohol. A possible example of propylene oxy alcohol is, for example, Sannix GP250 or Sannix GP400 (made by Sanyo Chemical Industries Co., Ltd.).

The alkylene oxyalkyl ether is desirably an ethylene oxyalkyl ether having 1 to 4 carbon atoms in the alkyl part, or a propylene oxyalkyl ether having 1 to 4 carbon atoms in the alkyl part. Possible examples of the alkylene oxyalkyl ether are: ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether, and the like.

In the present embodiment of the invention, desirably, the resin micro-particles are self-dispersing polymer particles, and the water-soluble organic solvent is propylene oxy alcohol, ethylene oxyalkyl ether (the alkyl part having 1 to 4 carbon atoms) and/or propylene oxyalkyl ether (the alkyl part having 1 to 4 carbon atoms), and moreover, desirably, the resin micro-particles are self-dispersing polymer particles including water-insoluble polymer containing a hydrophilic constituent unit and a constituent unit originating in a monomer containing an aromatic group, and the water-soluble organic solvent is propylene oxy alcohol and ethylene oxyalkyl ether (the alkyl part having 1 to 4 carbon atoms) and/or propylene oxyalkyl ether (the alkyl part having 1 to 4 carbon atoms).

Furthermore, in addition to the water-soluble organic solvent described above, according to requirements, it is also possible to include another organic solvent with the object of preventing drying, promoting permeation, and adjusting the viscosity, and so on.

In order to prevent drying, a water-soluble organic solvent having a lower vapor pressure than water is desirable. Specific examples of a water-soluble organic solvent which is suitable for preventing drying include: a polyvalent alcohol, typically, ethylene glycol, propylene glycol, diethylene glycol, polyethylene glycol, thio diglycol, dithio diglycol, 2-methyl-1,3-propane diol, 1,2,6-hexane triol, an acetylene glycol derivative, glycerine, trimethylol propane, or the like, a heterocyclic ring, such as 2-pyrrolidone, N-methyl-2-pyrrolidone, 1,3-dimethyl-2-imidazolidinone, N-ethyl morpholine, or the like, a sulfurous compound, such as sulfolane, dimethyl sulfoxide, 3-sulfolene, or the like, a polyfunctional compound, such as diacetone alcohol, diethanol amine, or the like, or a urea derivative, or the like. Of these, a polyvalent alcohol such as glycerine, diethylene glycol, or the like, is desirable.

Furthermore, in order to promote permeation, an organic solvent can be used with the object of causing the ink composition to permeate better into the recording medium. Specific examples of an organic solvent which is suitable for promoting permeation are: alcohols such as ethanol, isopropanol, butanol, 1,2-hexane diol, or the like, or sodium lauryl sulfate or sodium oleate, or a nonionic surfactant, or the like.

Furthermore, the water-soluble organic solvent can also be used to adjust the viscosity, in addition to the object described above. Specific examples of water-soluble organic solvents which can be used to adjust the viscosity are: alcohols (for example, methanol, ethanol, propanol, or the like), an amine (for example, ethanol amine, diethanol amine, triethanol amine, ethylene diamine, diethylene triamine, or the like), and other polar solvents (for example, formamide, N,N-dimethyl formamide, N,N-dimethyl acetoamide, dimethyl sulfoxide, sulfolane, 2-pyrrolidone, acetonitrile, acetone, or the like).

The amount of water-soluble organic solvent contained in the ink can be adjusted suitably in such a manner that the MFT during actual fixing is lower than $MFT^{0}$, but this amount is desirably no less than 5 wt % and no more than 30 wt %, and more desirably, no less than 10 wt % and no more than 25 wt %.

Water (E)

The ink composition includes water, but there are no particular restrictions on the amount of water. Of these, the desirable content of water is 10 to 99 wt %, more desirably, 30 to 80 wt %, and even more desirably, 50 to 70 wt %.

Surfactant

Desirably, a surfactant is added to the aqueous ink. For the surfactant, it is effective to use a compound having a structure which combines a hydrophilic part and a hydrophobic part in the molecule, for instance, and it is possible to use any one of an anionic surfactant, a cationic surfactant, an amphoteric compound, or a nonionic surfactant. Moreover, it is also possible to use the polymer material described above (polymer dispersant), as a surfactant.

Other Components

The aqueous ink used in the present embodiment of the invention may also include other additives. The other additives may be commonly known additives, for example, an ultraviolet light absorber, an anti-fading agent, an antibacterial agent, a pH adjuster, an anti-rusting agent, an antioxidant, an emulsion stabilizer, an antiseptic agent, an antifoaming agent, a viscosity enhancer, a dispersion stabilizer, a chelating agent, or the like.

Definition of $MFT^{0}$ and $MFT^{25}$

"$MFT^{0}$" is the minimum filming temperature when the resin particles used in the aqueous ink composition are dispersed in water. The value of $MFT^{0}$ can be measured using an MFT measurement device manufactured by Yoshimitsu Seiki Co., Ltd. More specifically, a water dispersion obtained by dispersing desired resin particles in water is adjusted to a 25 wt % preparation and coated by blade onto a film (of 64 cm×18 cm size, for example) to achieve a coating thickness of 300 μm (to a size of 50 cm length×width 3 cm, for example), whereupon heat is applied from the rear side of the film to apply a temperature gradient of 12° C. to 65° C. to the coated film, the film is dried for 4 hours in an environment of 20° C. and 22% RH, and the interface temperature (° C.) in this case between the temperature at which a precipitate of white powder is produced and the temperature at which a transparent film is formed is measured and taken to be the lowest filming temperature.

Moreover, "$MFT^{25}$" is the minimum filming temperature when the resin particles used for the aqueous ink composition are in a mixed liquid of water and water-soluble organic solvent at a content of 25 wt % with respect to the solid content of the resin particles. $MFT^{25}$ can be measured by carrying out an operation similar to that for $MFT^{0}$ described above, apart from the fact that a mixed liquid (aqueous solution) of 25 wt % of resin particles (solid component by mass), 6.25 wt % of water-soluble organic solvent (25 wt % with respect to the polymer solid content) and 68.75 wt % of water was prepared in the operation for measuring $MFT^{0}$. Furthermore, if "$MFT^{25}$" exceeds the upper limit value of the measurement device, then "$MFT^{30}$" to "$MFT^{50}$" are measured appropriately when water-soluble organic solvent and water are mixed to 30 to 50 wt % with respect to the solid content of resin particles, in order to estimate "$MFT^{25}$".

Treatment Liquid

The aqueous treatment liquid contains at least one solidifying agent which solidifies the components in aqueous ink. The solidifying agent is able to solidify (aggregate) the ink by making contact with the ink on the paper. For example, by applying an aqueous treatment liquid, droplets of aqueous ink are deposited in a state where a solidifying agent is present on the paper and they make contact with the solidifying agent, whereby the component in the aqueous ink can be made to aggregate and solidify on the paper.

Since it is desirable to be able to solidify (aggregate) the aqueous ink, desirably, the solidifying agent is a material that dissolves readily in the aqueous ink upon making contact with the aqueous ink and from this viewpoint, a polyvalent metallic salt having high water solubility is more desirable and an acidic material having high water solubility is also desirable. Furthermore, from the viewpoint of solidifying the whole of the ink by reacting with the aqueous ink, a bivalent or higher-valence acidic material is especially desirable. Moreover, it is also possible to use a cationic compound.

Here, the aggregating reaction of the aqueous ink may be achieved by reducing the dispersion stability of the particles (coloring material (for example, pigment), resin particles, etc.) which are dispersed in the aqueous ink, and causing the overall viscosity of the ink to rise. For example, the surface potential of the particles in the ink, such as pigment and resin particles, which are held in stable dispersion by a weakly acidic functional group, such as a carboxyl group, is lowered by reacting with an acidic material having a lower pKa, thereby reducing the dispersion stability. Consequently, the acidic material forming a solidifying agent which is contained in the aqueous treatment liquid is desirably one having a low pKa, high solubility and valence of 2 or above, and more desirably, it is a bivalent or trivalent acidic material having a high buffering function in a lower pH region than the pKa of the functional group (for example, carboxyl group) which stabilizes the dispersion of the particles in the ink.

The content ratio of the solidifying agent which solidifies the aqueous ink in the aqueous treatment liquid is desirably, 1 to 40 wt %, more desirably, 5 to 30 wt % and even more desirably 10 to 25 wt %.

The aqueous treatment liquid according to the present embodiment of the invention can generally also include, in addition to the solidifying agent, a water-soluble organic solvent, and furthermore, similarly to the aqueous ink, may also contain other additives of various kinds. The organic solvent may be used independently, or a combination of two or more types of organic solvent may be used. Furthermore, desirably, these organic solvents are contained in a range of 1 to 50 wt % in the treatment liquid.

General Composition of Inkjet Recording Apparatus

Next, a desirable embodiment of the inkjet recording apparatus which forms a concrete example of the image forming apparatus relating to the present embodiment of the invention will be described. However, the present embodiment of the invention is not limited to an inkjet recording apparatus. Furthermore, it is also possible to form an image by a transfer method which transfers an image to a recording medium, after recording an image on an intermediate transfer medium by a belt conveyance method.

Firstly, the overall composition of an inkjet recording apparatus according to an embodiment of the invention will be described.

FIG. 1 is a structural diagram illustrating the entire configuration of an inkjet recording apparatus 1 of the present embodiment. The inkjet recording apparatus 1 shown in the drawing forms an image on a recording surface of a recording medium 22. The inkjet recording apparatus 1 includes a paper feed unit 10, a treatment liquid application unit 12, an image formation unit 14, a drying unit 16, a fixing unit 18, and a discharge unit 20 as the main components. A recording medium 22 (paper sheets) is stacked in the paper feed unit 10, and the recording medium 22 is fed from the paper feed unit 10 to the treatment liquid application unit 12. A treatment liquid is applied to the recording surface in the treatment liquid application unit 12, and then an ink is applied to the recording surface in the image formation unit 14. The image is fixed with the fixing unit 18 on the recording medium 22 onto which the ink has been applied, and then the recording medium is discharged with the discharge unit 20. In the embodiment illustrated in FIG. 1, the treatment liquid application unit 12 corresponds to a treatment liquid deposition device and a treatment liquid drying device, the image formation unit 14 corresponds to an ink ejection device, the drying unit 16 corresponds to a drying device, and the fixing unit 18 corresponds to a fixing device.

In the inkjet recording apparatus 1, intermediate conveyance units 24, 26, 28 are provided between the units, and the recording medium 22 is transferred by these intermediate conveyance units 24, 26, 28. Thus, a first intermediate conveyance unit 24 is provided between the treatment liquid application unit 12 and image formation unit 14, and the recording medium 22 is transferred from the treatment liquid application unit 12 to the image formation unit 14 by the first intermediate conveyance unit 24. Likewise, the second intermediate conveyance unit 26 is provided between the image formation unit 14 and the drying unit 16, and the recording medium 22 is transferred from the image formation unit 14 to the drying unit 16 by the second intermediate conveyance unit 26. Further, a third intermediate conveyance unit 28 is provided between the drying unit 16 and the fixing unit 18, and the recording medium 22 is transferred from the drying unit 16 to the fixing unit 18 by the third intermediate conveyance unit 28.

Each unit (paper feed unit 10, treatment liquid application unit 12, image formation unit 14, drying unit 16, fixing unit 18, discharge unit 20, and first to third intermediate conveyance units 24, 26, 28) of the inkjet recording apparatus 1 will be described below in greater details.

Paper Feed Unit

The paper feed unit 10 is a mechanism that feeds the recording medium 22 to the image formation unit 14. A paper feed tray 50 is provided in the paper feed unit 10, and the recording medium 22 is fed, sheet by sheet, from the paper feed tray 50 to the treatment liquid application unit 12.

Treatment Liquid Deposition Unit

The treatment liquid deposition unit 12 is a mechanism for depositing treatment liquid onto the recording surface of the recording medium 22, and the treatment liquid contains a component which aggregates or increases the viscosity of the coloring material (pigment) in the ink.

Possible methods for depositing the treatment liquid are: droplet ejection by an inkjet head, application by roller, uniform deposition by spraying, and the like.

The treatment liquid drum 54 is a drum that holds and rotationally conveys the recording medium 22. The treatment liquid drum 54 is driven to rotate. The treatment liquid drum 54 is provided on the outer peripheral surface thereof with a hook-shaped holding device, by which the leading end of the recording medium 22 is held. In a state in which the leading end of the recording medium 22 is held by the holding device, the treatment liquid drum 54 is rotated to convey rotationally the recording medium. In this case, the recording medium 22 is conveyed so that the recording surface thereof faces outside. The treatment liquid drum 54 may be provided with suction holes on the outer peripheral surface thereof and connected to a suction device that performs suction from the suction holes. As a result, the recording medium 22 can be tightly held on the circumferential surface of the treatment liquid drum 54.

There are no particular restrictions on the composition of the treatment liquid application apparatus 56, but it is, for example, constituted by a treatment liquid container which stores treatment liquid, an anilox roller, a portion of which is immersed in the treatment liquid in the treatment liquid container, a squeegee which regulates the dose by abutting against the anilox roller, and a rubber roller which transfers the treatment liquid after dose regulation, to a recording medium 22, by abutting against the anilox roller and a recording medium 22 on the treatment liquid drum 54. According to this treatment liquid application apparatus 56, it is possible to apply treatment liquid to a recording medium 22 while regulating the dose by means of the squeegee. Desirably, the thickness of the film of treatment liquid is sufficiently smaller than the diameter of the liquid droplets of ink which are ejected from the inkjet heads 72M, 72C, 72Y and 72K of the print unit 14. For example, if the droplet ejection volume of the ink is 2 pl, then the average diameter of the liquid droplets is 15.6 μm. In this case, if the thickness of the film of treatment liquid is large, then the ink dots will float in the treatment liquid rather than making contact with the surface of the recording medium 22. Therefore, in order to obtain a deposited dot diameter of 30 μm or greater when the ink droplet ejection volume is 2 pl, it is desirable that the thickness of the film of treatment liquid should be 3 μm or less.

Image Formation Unit

As shown in FIG. 1, the image formation unit 14 is a mechanism for ejecting inks according to an inkjet method so as to form an image corresponding to an input image, and comprises an image formation drum 70 and inkjet heads 72C, 72M, 72Y, 72K that are proximally disposed in a position facing the outer peripheral surface of the image formation drum 70. The ink heads 72C, 72M, 72Y, 72K correspond to inks of four colors: cyan (C), magenta (M), yellow (Y), and black (K) and are disposed in the order of description from the upstream side in the rotation direction of the image formation drum 70.

The image formation drum 70 is a drum that holds the recording medium 22 on the outer peripheral surface thereof and rotationally conveys the recording medium. The image formation drum 70 is driven to rotate. The image formation drum 70 is provided on the outer peripheral surface thereof with a hook-shaped holding device 73, and the leading end of the recording medium 22 is held by the holding device 73. In a state in which the leading end of the recording medium 22 is held by the holding device 73, the image formation drum 70 is rotated to convey rotationally the recording medium. In this case, the recording medium 22 is conveyed so that the recording surface thereof faces outside. Inks are applied to the recording surface by the inkjet heads 72C, 72M, 72Y, 72K.

The inkjet heads 72C, 72M, 72Y, 72K are recording heads (inkjet heads) of an inkjet system of a full line type that have a length corresponding to the maximum width of the image formation region in the recording medium 22. A nozzle row is formed on the ink ejection surface of the ink head. The nozzle row has a plurality of nozzles arranged therein for discharging ink over the entire width of the image recording region. Each inkjet head 72C, 72M, 72Y, 72K is fixedly disposed so as to extend in the direction perpendicular to the conveyance direction (rotation direction of the image formation drum 70) of the recording medium 22.

The ink heads 72C, 72M, 72Y, 72K are respectively provided with ink cassettes containing colored inks of corresponding colors.

Droplets of the colored inks are ejected from the inkjet heads 72C, 72M, 72Y, 72K toward the recording surface of the recording medium 22 held on the outer peripheral surface of the image formation drum 70. As a result, the ink comes into contact with the treatment liquid that has been heretofore applied on the recording surface by the treatment liquid application unit 12, the coloring material (pigment) dispersed in the ink is aggregated, and a coloring material aggregate is formed. Therefore, the coloring material flow on the recording medium 22 is prevented and an image is formed on the recording surface of the recording medium 22. In this case, because the image formation drum 70 of the image formation unit 14 is structurally separated from the treatment liquid drum 54 of the treatment liquid application unit 12, the treatment liquid does not adhere to the inkjet heads 72C, 72M, 72Y, 72K, and the number of factors preventing the ejection of ink can be reduced.

In the present example, a CMYK standard color (four color) configuration is described, but combinations of ink colors and numbers of colors are not limited to that of the present embodiment, and if necessary, light inks, dark inks, and special color inks may be added. For example, a configuration is possible in which an inkjet head is added that ejects a light ink such as light cyan and light magenta. The arrangement order of color heads is also not limited.

Drying Unit

The drying unit 16 is desirably provided where appropriate to dry the solvent (water) that is separated due to the coloring material aggregation action. The drying unit 16 includes a drying drum 76 and a first IR heater 78, a warm-air blow-out nozzle 80, and a second IR heater 82 disposed in positions facing the outer peripheral surface of the drying drum 76. The first IR heater 78 is provided upstream of the warm-air blow-out nozzle 80 in the rotation direction (counterclockwise direction in FIG. 1) of the drying drum 76, and the second IR heater 82 is provided downstream of the warm-air blow-out nozzle 80.

The drying drum 76 is a drum that holds the recording medium 22 on the outer peripheral surface thereof and rotationally conveys the recording medium. The drying drum 76 is driven to rotate. Further, the drying drum 76 is provided on the outer peripheral surface thereof with hook-shaped holding device, by which the leading end of the recording medium 22 is held. In a state in which the leading end of the recording medium 22 is held by the holding device, the drying drum 76 is rotated to convey rotationally the recording medium. In this case, the recording medium 22 is conveyed so that the recording surface thereof faces outside. The drying treatment is carried out by the first IR heater 78, warm-air blow-out nozzle 80, and second IR heater 82 with respect to the recording surface of the recording medium.

The warm-air blow-out nozzle 80 is configured to blow hot air at a high temperature (for example, 50° C. to 70° C.) at a constant blowing rate (for example, 12 $m^3$/min) toward the recording medium 22, and the first IR heater 78 and second IR heater 82 are controlled to respective high temperature (for example, 180° C.).

In this case, because the drying drum 76 of the drying unit 16 is structurally separated from the image formation drum 70 of the image formation unit 14, the number of ink non-ejection events caused by drying of the head meniscus portion by thermal drying can be reduced in the ink heads 72C, 72M, 72Y, 72K. Further, there is a degree of freedom in setting the temperature of the drying unit 16, and the optimum drying temperature can be set.

The outer peripheral surface of the aforementioned drying drum 76 may be controlled to a predetermined temperature (for example, not higher than 60° C.).

The drying drum 76 may be provided with suction holes on the outer peripheral surface thereof and connected to a suction device which performs suction from the suction holes. As a result, the recording medium 22 can be tightly held on the circumferential surface of the drying drum 76.

In the drying unit, desirably, the water content of the ink is dried to an extent whereby transfer to the fixing roller (roller offset) does not occur in the subsequent fixing unit. More specifically, it is desirable to dry the ink within the range of 1 g/$m^2$ to 6 g/$m^2$.

Fixing Unit

The fixing unit 18 includes a fixing drum 84, a first fixing roller 86, a second fixing roller 88, and an inline sensor 90. The first fixing roller 86, second fixing roller 88, and inline sensor 90 are arranged in positions opposite the circumferential surface of the fixing drum 84 in the order of description from the upstream side in the rotation direction of the fixing drum 84.

The fixing drum 84 holds the recording medium 22 on the outer peripheral surface thereof, and rotationally conveys the recording medium. The fixing drum 84 is driven to rotate. The fixing drum 84 has a hook-shaped holding device, and the leading end of the recording medium 22 can be held by this holding device. The recording medium 22 is rotated and conveyed by rotating the fixing drum 84 in a state in which the leading end of the recording medium is held by the holding device. In this case, the recording medium 22 is conveyed so that the recording surface thereof faces outside, and the fixing treatment by the first fixing roller 86 and second fixing roller 88 and the inspection by the inline sensor 90 are performed with respect to the recording surface.

The first fixing roller 86 and second fixing roller 88 are roller members which heat and press the dried ink to melt and set the self-dispersible polymer particles in the dried ink so that the dried ink forms a film, and they are configured to apply pressure and heat to the recording medium 22. More specifically, the first fixing roller 86 and second fixing roller 88 are arranged so as to be pressed against the fixing drum 84 at a certain pressure (e.g. 0.3 MPa), and a nip roller is configured between them and the fixing drum 84. Thereby, the recording medium 22 is squeezed between the first fixing roller 86 and the fixing drum 84 and between the second fixing roller 88 and the fixing drum 84, nipped under a predetermined nip pressure (for example, 0.3 MPa), and subjected to fixing treatment.

It is desirable that an elastic layer is formed on the surface of the fixing drum 84 or the surfaces of the first fixing roller 86 and the second fixing roller 88 to obtain a configuration providing a uniform nip width with respect to the recording medium 22. For example, each of the surface of the first fixing roller 86 and the surface of the second fixing roller 88 has a two-layer composition, in which the first layer on the outside is composed of a member having separating properties, and the second layer (inside layer) is composed of an elastic rubber member. By forming the first layer of a material having separating properties, the roller becomes less liable to soiling and it is possible to reduce the cleaning load of the roller. Furthermore, desirably, the second layer uses an elastic rubber member having a rubber hardness of 50 degrees or less. By forming the second layer of an elastic rubber material having a hardness of 50 degrees or less, it is possible to gain time during which the recording medium 22 is nipped, which is beneficial in respect of film formation during high-speed recording. Furthermore, by setting the second layer to have a hardness of 50 degrees of less, it becomes possible to reduce the pressure when making contact with the recording medium 22, and it is possible to improve the lifespan of the roller. On the other hand, it is desirable that the first fixing roller 86 and the second fixing roller 88 have a roller surface hardness equal to or lower than 70 degrees. By lowering the surface hardness of the roller, the ability of the roller to follow the recesses and projections in the image (in a certain time period) is improved, which is beneficial in respect of film formation in the case of high-speed recording.

Further, the first fixing roller 86 and the second fixing roller 88 are configured by heating rollers in which a halogen lamp is incorporated in a metal pipe, for example made of aluminum, having good thermal conductivity and the rollers are controlled to a predetermined temperature.

The prescribed temperature described above is controlled so as to satisfy to $MFT^{25} \leqq T \leqq MFT^{25}+50$ (° C.), when the surface temperature of the recording medium is taken as T. By satisfying the temperature range described above, the MFT in a solvent composition which is close to the state during fixing can be envisaged and adjusted to a suitable fixing temperature, and therefore it is possible to suppress roller offset. Desirably, the fixing temperature is $MFT^{25}+10$ (° C.)$\leqq T \leqq MFT^{25}+30$ (° C.).

If the fixing temperature T is lower than $MFT^{25}$, then the resin particles do not melt and therefore the ink cannot be made to form a film and wear resistance is diminished. Conversely, if the temperature is too high, then roller offset occurs during fixing, which is not desirable. Furthermore, if a coating layer has been formed on the recording medium, then fixing is carried out at or below a temperature which does not break down this coating layer. This is because, if the coating layer is broken, then roller offset may occur and the wear resistance may decline.

For example, if a coated paper having a coating layer containing micro-particles in a hydrophilic binder on only one surface of the recording medium is used, then desirably, fixing is carried out with the temperature T of the recording medium below 100° C. When a coated paper is used as the recording medium, then if the heating temperature of the recording medium exceeds 100° C., the water content of the recording medium evaporates off suddenly, and the image portion or the coating layer of the coating paper itself breaks, giving rise to roller offset as well as reduced wear resistance. Moreover, with change in the water content in the recording medium, indentations may occur in the recording medium.

Furthermore, desirably, a water content measurement device 83 is provided on the downstream side of the drying unit, and the water content is measured and the heating device is controlled in accordance with this water content. In the present embodiment of the invention, as described previously, it is desirable to use a water-soluble organic solvent having a lower vapor pressure than water and the water-soluble organic solvent. Therefore, the water dries out readily and during fixing, depending on the initial composition of the solvent in the ink, a solvent component containing a large amount of water-soluble organic solvent is obtained. Therefore, in the present embodiment of the invention, since $MFT^{25}$ is lower than $MFT^{0}$, it is possible to reduce MFT by means of the initial composition of the ink solvent. Moreover, by measuring the water content and controlling the fixing temperature in accordance with the water content, it is possible to carry out fixing within a desirable temperature range, and a good image can be formed. For example, if the water content is high, then MFT becomes high and therefore it is necessary to set the temperature T to a high temperature. If, conversely, the water content is low, then MFT becomes low and it is possible to carry out fixing at a low temperature.

In the embodiment described above, a composition comprising two fixing rollers, namely, a first fixing roller 86 and a second fixing roller 88, is described, but it is also possible to provide fixing rollers in a plurality of stages, depending on the image thickness and the Tg properties of the latex particles. Furthermore, the number of fixing rollers is not limited to two rollers, and it is also possible to use one fixing roller. Moreover, in order to control the temperature of the recording medium when nipped by the fixing rollers, a non-contact heater (for example, a halogen lamp) for preheating the medium may be provided on the upstream side of the fixing rollers. Furthermore, it is also possible to control the surface of the fixing drum 84 and to thereby adjust the temperature T of the recording medium.

On the other hand, the inline sensor 90 is a measuring device which measures the check pattern, moisture amount, surface temperature, gloss, and the like of the image fixed to the recording medium 22. A CCD sensor or the like can be used for the inline sensor 90.

According to the fixing unit 18 which is composed as described above, since the latex particles in the ink droplets ejected by the print unit 14 are caused to melt by being heated and pressurized by the first fixing roller 86 and the second fixing roller 88, then it is possible to secure and fix the latex particles onto the recording medium 22 and therefore wear resistance can be improved. In this case, by making the temperature T, which is the surface temperature of the recording medium during fixing, satisfy the relationship $MFT^{25} \leqq T \leqq MFT^{25}+50$ (° C.) with respect to the $MFT^{25}$ value of the resin particles contained in the ink, the MFT in a solvent composition close to the state during fixing can be envisaged and the fixing temperature can be adjusted to a suitable temperature, whereby it is possible to suppress roller offset.

In addition, with the fixing unit 18, the fixing drum 84 is structurally separated from other drums. Therefore, the temperature of the fixing unit 18 can be freely set separately from the image formation unit 14 and drying unit 16.

Further, the above-described fixing drum 84 may be provided with suction holes on the outer peripheral surface thereof and connected to a suction device which performs suction from the suction holes. As a result, the recording medium 22 can be tightly held on the circumferential surface of the fixing drum 84.

Discharge Unit

As shown in FIG. 1, the discharge unit 20 is provided after the fixing unit 18. The discharge unit 20 includes a discharge tray 92, and a transfer drum 94, a conveying belt 96, and a tension roller 98 are provided between the discharge tray 92 and the fixing drum 84 of the fixing unit 18 so as to face the discharge tray and the fixing drum. The recording medium 22 is fed by the transfer drum 94 onto the conveying belt 96 and discharged into the discharge tray 92.

Intermediate Conveyance Unit

The structure of the first intermediate conveyance unit 24 will be described below. A second intermediate conveyance unit 26 and a third intermediate conveyance unit 28 are configured identically to the first intermediate conveyance unit 24 and the explanation thereof will be omitted.

The first intermediate conveyance unit 24 has an intermediate conveyance body 30. The intermediate conveyance body 30 is a drum for receiving the recording medium 22 from a drum of a previous stage, rotationally conveying the recording medium, and transferring it to a drum of the subsequent stage, and the intermediate conveyance body 30 is rotationally mounted. The intermediate conveyance body 30 is rotated by a motor (not shown).

Hook-shaped holding devices are provided with a 90° spacing on the outer peripheral surface of the intermediate conveyance body 30. The holding device rotates, while describing a circular path, and the leading end of the recording medium 22 is held by the action of the holding device. Therefore, the recording medium 22 can be rotationally conveyed by rotating the intermediate conveyance body 30 in a state in which the leading end of the recording medium 22 is held by the holding device. It is desirable that the surface of the intermediate conveyance body 30 is provided with a plurality of blower ports to blow air so that the recording medium is conveyed while the recording surface of the recording medium is not in contact with the surface of the intermediate conveyance body 30.

The recording medium 22 conveyed by the first intermediate conveyance unit 24 is transferred to a drum of the subsequent stage (that is, the image formation drum 70). In this case, the transfer of the recording medium 22 is performed by synchronizing the holding device 34 of the intermediate conveyance unit 24 and the holding device 73 of the image formation unit 14. The transferred recording medium 22 is held by the image formation drum 70 and rotationally conveyed.

Structure of Inkjet Heads

The structure of inkjet heads will be described below. Because ink heads 72C, 72M, 72Y, 72K provided corresponding to colors respectively have a common structure, an inkjet head (hereinafter also simply called "head") representing them will be denoted below with a reference symbol 100.

Figure 2A:
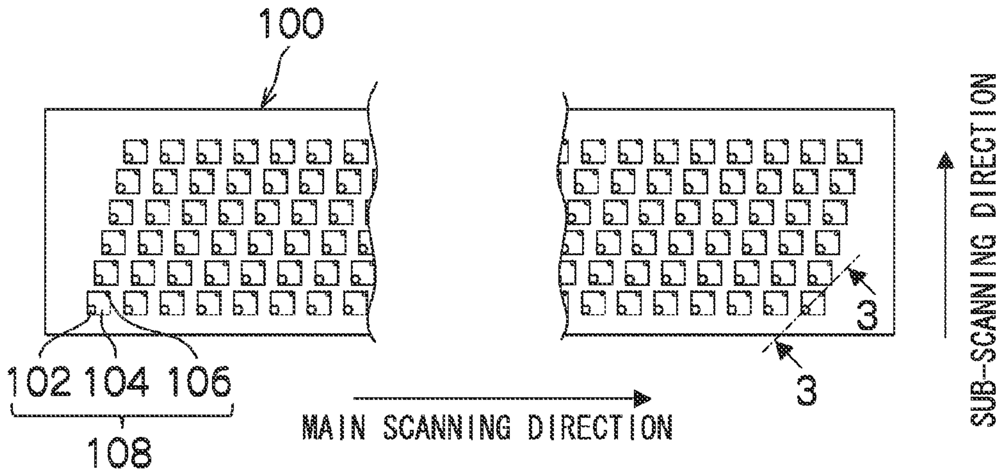
FIGS. 2A to 2C are plan view perspective diagrams illustrating examples of the composition of a head.
Figure 2B:
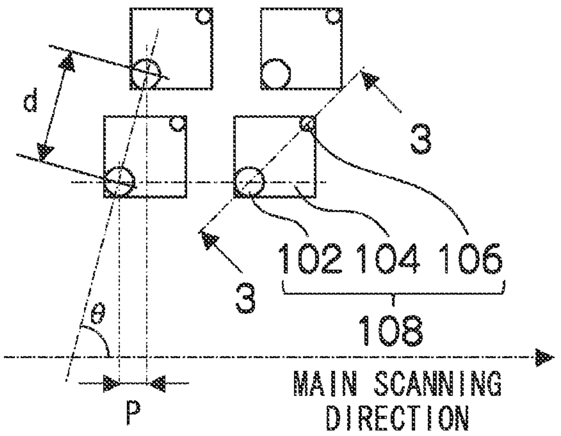
Figure 2C:
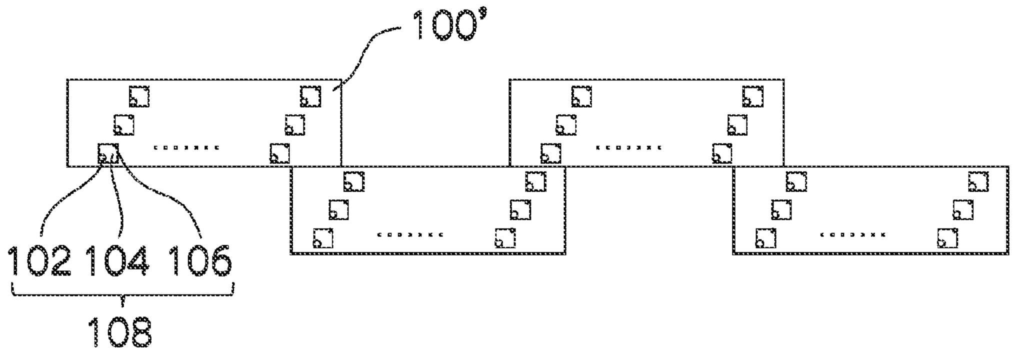
Figure 3:
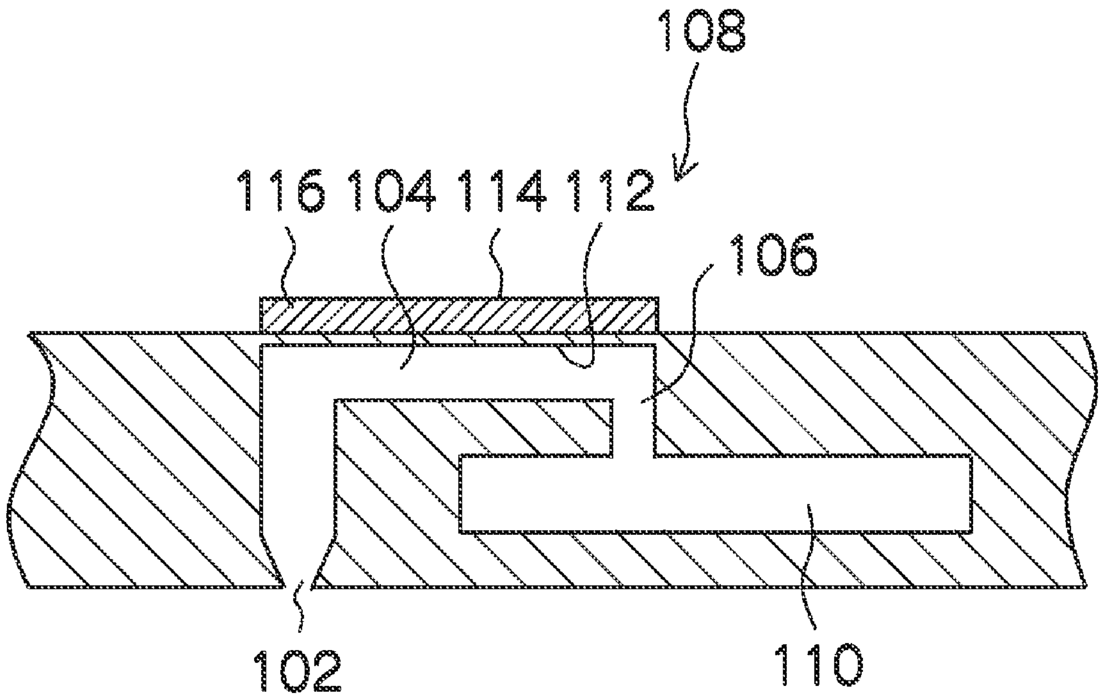
FIG. 3 is a cross-sectional diagram illustrating the composition of an ink chamber unit.

FIG. 2A is a planar perspective view illustrating a structure of the ink head 100. FIG. 2B is an enlarged view of part thereof. FIG. 2C is a planar perspective view illustrating another example of the structure of the head 100. Further, FIG. 3 is a cross sectional view of an ink chamber unit along line 2C-2C of FIGS. 2A and 2B.

A nozzle pitch density in the ink head 100 has to be increased in order to increase the pitch density of dots printed on the recording medium 22. As shown in FIGS. 2A and 2B, the ink head 100 of the present example has a structure in which a plurality of ink chamber units (liquid droplet ejection elements serving as recording element units) 108, each including a nozzle 102 serving as an ink ejection port and a pressure chamber 104 corresponding to the nozzle 102, are arranged in a zigzag manner as a matrix (two-dimensional configuration). As a result, it is possible to increase substantially the density of nozzle spacing (projected nozzle pitch) that is projected to ensure alignment along the longitudinal direction of the head (direction perpendicular to the conveyance direction of the recording medium 22: the main scanning direction).

A mode of configuring at least one nozzle column along a length corresponding to the entire width of the image formation region of the recording medium 22 in the direction (the main scanning direction) that is almost perpendicular to the conveyance direction (sub-scanning direction) of the recording medium 22 is not limited to the example shown in the drawing. For example, instead of the configuration shown in FIG. 2A, a line head that as a whole has a nozzle row of a length corresponding to the entire width of the recording medium 22 may be configured by arranging in a zigzag manner short head blocks 100' in which a plurality of nozzles 102 are arranged two-dimensionally and enlarging the length by joining the modules (blocks) together as shown in FIG. 2C. Although omitted from the drawings, a plurality of short heads may be aligned in a line to form a line head.

The pressure chamber 104 provided correspondingly to each nozzle 102 has an almost square shape in the plan view thereof, the nozzle 102 is provided in one of the two corners on a diagonal of the pressure chamber, and a supply port 106 of the supplied ink is provided in the other corner on the diagonal. The shape of the pressure chamber 104 is not limited to that of the present example, and a variety of planar shapes, for example, a polygon such as a rectangle (rhomb, rectangle, etc.), a pentagon and a heptagon, a circle, and an ellipse can be employed.

Each pressure chamber 104 communicates with a common flow channel 110 via the supply port 106. The common flow channel 110 communicates with an ink tank (not shown in the drawing) that serves as an ink supply source, and the ink supplied from the ink tank is supplied into each pressure chamber 104 via the common flow channel 110.

Piezoelectric elements 116 that are respectively provided with individual electrodes 114 are joined to a diaphragm 112 that forms a part of the surface (top surface in FIG. 3) of each pressure chamber 104 and also functions as a common electrode. Where a drive voltage is applied to the individual electrode 114, the piezoelectric element 116 is deformed, the volume of the pressure chamfer 104 changes, and the ink is ejected from the nozzle 102 by the variation in pressure that follows the variation in volume. When the displacement of the piezoelectric element 116 returns to the original state after the ink has been ejected, the pressure chamber 104 is refilled with new ink from the common flow channel 110 via the supply port 106.

In the present example, a piezoelectric element 116 is used as an ink ejection force generating device which causes ink to be ejected from a nozzle 100 provided in a head 102, but it is also possible to employ a thermal method in which a heater is provided inside the pressure chamber 104 and ink is ejected by using the pressure of the film boiling action caused by the heating action of this heater.

A high-density nozzle head of the present example is realized by arranging a large number of ink chamber units 108 having the above-described configuration in a grid-like manner with a constant arrangement pattern along a row direction coinciding with the main scanning direction and an oblique column direction that is inclined at a certain angle θ, rather than perpendicular, to the main scanning direction, as shown in FIG. 2B.

Thus, with a structure in which a plurality of ink chamber units 108 are arranged with a constant pitch, d, along a direction inclined at a certain angle θ to the main scanning direction, a pitch, P, of nozzles projected (front projection) to be aligned in the main scanning direction will be d×cos θ, and with respect to the main scanning direction, the configuration can be handled as equivalent to that in which the nozzles 102 are arranged linearly with a constant pitch P. With such a configuration, it is possible to realize a substantial increase in density of nozzle columns that are projected so as to be aligned in the main scanning direction (for example, 2400 nozzles/inch).

When implementing the present embodiment of the invention, the arrangement structure of the nozzles is not limited to the example illustrated in the drawings, and it is also possible to apply various other types of nozzle arrangements, such as an arrangement structure having one nozzle row in the sub-scanning direction.

Furthermore, the scope of application of the present embodiment of the invention is not limited to a printing system based on a line type of head, and it is also possible to adopt a serial system where a short head which is shorter than the breadthways dimension of the recording medium 22 is scanned in the breadthways direction (main scanning direction) of the recording medium 22, thereby performing printing in the breadthways direction, and when one printing action in the breadthways direction has been completed, the recording medium 22 is moved through a prescribed amount in the direction perpendicular to the breadthways direction (the sub-scanning direction), printing in the breadthways direction of the recording medium 22 is carried out in the next printing region, and by repeating this sequence, printing is performed over the whole surface of the printing region of the recording medium 22.

Explanation of Control System

Figure 4:
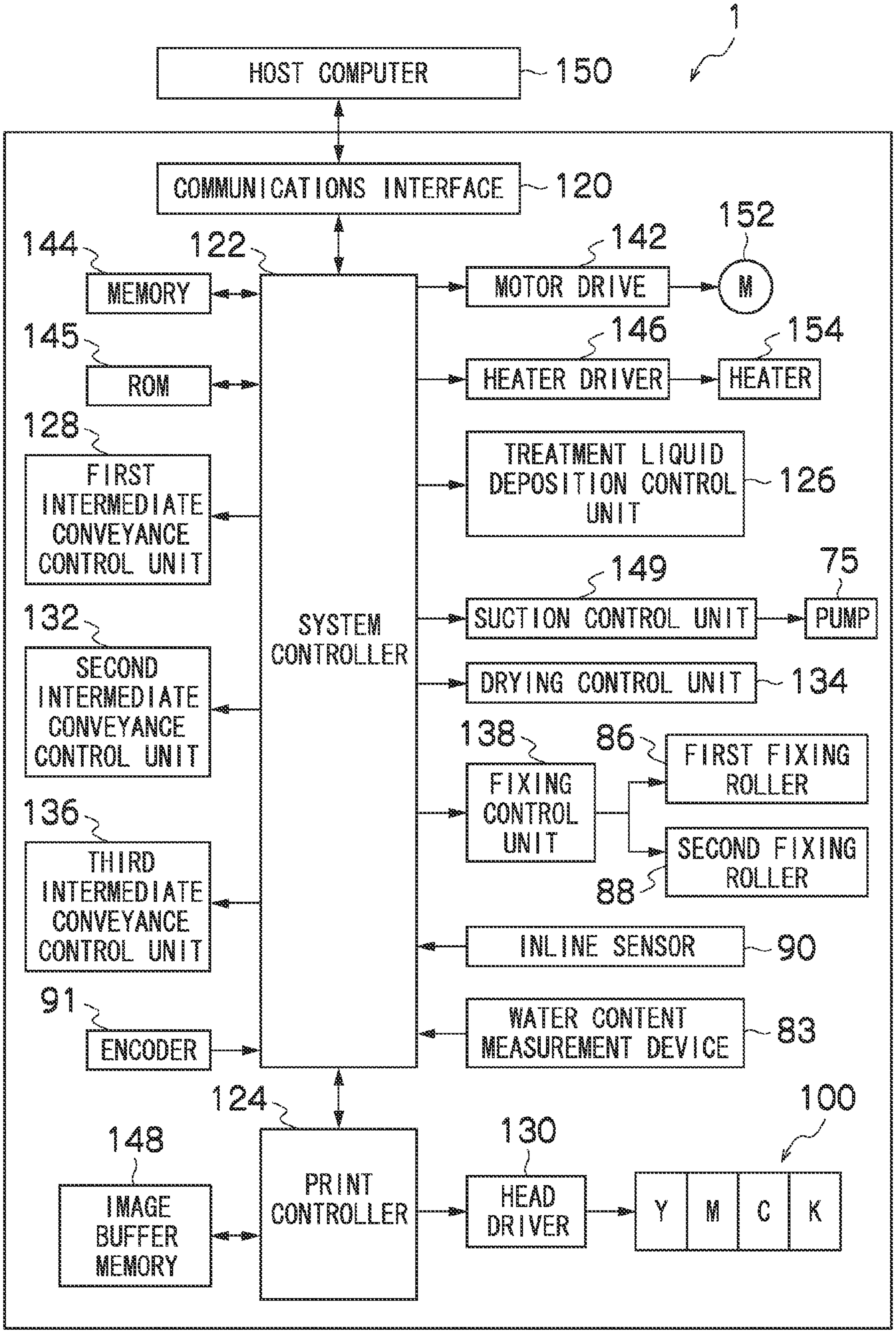
FIG. 4 is a principal block diagram illustrating a system configuration of the inkjet recording apparatus illustrated in FIG. 1.

FIG. 4 is a block diagram of the main portion of a system configuration of the inkjet recording apparatus 1. The inkjet recording apparatus 1 includes a communication interface 120, a system controller 122, a printing control unit 124, a treatment liquid application control unit 126, a first intermediate conveyance control unit 128, a head driver 130, a second intermediate conveyance control unit 132, a drying control unit 134, a third intermediate conveyance control unit 136, a fixing control unit 138, an inline sensor 90, an encoder 91, a motor driver 142, a memory 144, a heater driver 146, an image buffer memory 148, and a suction control unit 149.

The communication interface 120 is an interface unit that receives image data sent from a host computer 150. A serial interface such as USB (Universal Serial Bus), IEEE 1394, Ethernet, and a wireless network, or a parallel interface such as Centronix can be applied as the communication interface 120. A buffer memory (not shown in the drawing) may be installed in the part of the interface to increase the communication speed. The image data sent from the host computer 150 are introduced into the inkjet recording apparatus 1 via the communication interface 120 and temporarily stored in the memory 144.

The system controller 122 includes a central processing unit (CPU) and a peripheral circuitry thereof, functions as a control device that controls the entire inkjet recording apparatus 1 according to a predetermined program, and also functions as an operational unit that performs various computations. Thus, the system controller 122 controls various units such as the treatment liquid application control unit 126, first intermediate conveyance control unit 128, head driver 130, second intermediate conveyance control unit 132, drying control unit 134, third intermediate conveyance control unit 136, a fixing control unit 138, motor driver 142, memory 144, heater driver 146, and suction control unit 149, performs communication control with the host computer 150, performs read/write control of the memory 144, and also generates control signals for controlling the motors 152 of the conveyance system and the heaters 154.

The memory 144 is a storage device that temporarily stores the images inputted via the communication interface 120 and reads/writes the data via the system controller 122. The memory 144 is not limited to a memory composed of semiconductor elements and may use a magnetic medium such as a hard disk.

Programs that are executed by the CPU of the system controller 122 and various data necessary for performing the control are stored in the ROM 145. The ROM 145 may be a read-only storage device or may be a writable storage device such as EEPROM. The memory 144 can be also used as a region for temporary storing image data, a program expansion region, and a computational operation region of the CPU.

The motor driver 142 drives the motor 152 according to the indications from the system controller 122. In FIG. 4, a representative example of the motors disposed for all the units in the apparatus is denoted by the reference numeral 152. For example, the motor 152 shown in FIG. 4 includes motors for driving the rotation of the transfer drum 52, treatment liquid drum 54, image formation drum 70, drying drum 76, fixing drum 84, and transfer drum 94 shown in FIG. 1, a drive motor for the pump 75 designed for negative-pressure suction from the suction holes of the image formation drum 70, and motors of reciprocating mechanisms of the head units of ink heads 72C, 72M, 72Y, and 72K.

The heater driver 146 drives the heater 154 according to the indications from the system controller 122. In FIG. 4, a representative example of a plurality of heaters provided in the inkjet recording apparatus 1 is denoted by the reference numeral 154. For example, the heaters 154 shown in FIG. 4 include a pre-heater (not shown in the drawing) for heating the recording medium 22 in advance to an appropriate temperature in the paper feed unit 10.

The printing control unit 124 has a signal processing function for performing a variety of processing and correction operations for generating signals for print control from the image data within the memory 144 according to control of the system controller 122, and supplies the generated printing data (dot data) to the head driver 130. The required signal processing is implemented in the printing control unit 124, and the ejection amount and ejection timing of ink droplets in the ink head 100 are controlled via the head driver 130 based on the image data. As a result, the desired dot size and dot arrangement are realized.

The printing control unit 124 is provided with an image buffer memory 148, and data such as image data or parameters are temporarily stored in the image buffer memory 148 during image data processing in the printing control unit 124. In FIG. 4, a configuration is shown in which the image buffer memory 148 is installed for the printing control unit 124, but it can be also used in combination with the memory 144. Furthermore, a mode in which the printing control unit 124 and the system controller 122 are integrated and configured by one processor is also possible.

The head driver 130 outputs a drive signal for driving the piezoelectric element 116 corresponding to each nozzle 102 of the ink head 100 based on the printing data (that is, dot data stored in the image buffer memory 148) provided from the printing control unit 124. A feedback control system serving to maintain constant driving conditions of the heads may be included in the head driver 130.

The drive signal outputted from the head driver 130 is applied to the ink head 100, whereby ink is ejected from the corresponding nozzle 102. An image is formed on the recording medium 22 by controlling the ejection of ink from the ink head 100, while conveying the recording medium 22 with the predetermined speed.

Further, the system controller 122 controls the treatment liquid application control unit 126, first intermediate conveyance control unit 128, second intermediate conveyance control unit 132, drying control unit 134, third intermediate conveyance control unit 136, fixing control unit 138, and suction control unit 149.

The fixing control unit 138 controls the operations of the first fixing roller 86 and the second fixing roller 88 of the fixing unit 18 in accordance with instructions from the system controller 122. More specifically, the values of $MFT^{25}$ when using the resin particles, the water-soluble organic solvent, and the resin particles and water-soluble organic solvent, contained in the ink, are stored in the ROM 145 and the temperature of the first fixing roller 86 and the second fixing roller 88 can be set by introducing the resin particles and the water-soluble organic solvent. Furthermore, the water content after drying of the ink deposited on the recording medium is read in by the water content measurement device 83, and the temperature of the first fixing roller 86 and the second fixing roller 88 can be specified on the basis of this water content. Moreover, since the fixing temperature varies depending on the recording medium used, desirably, the recording medium is also input by means of a personal computer (not illustrated), or the like.

Recording Medium

The recording method used in the embodiments of the present embodiment of the invention is not limited in particular, and a variety of recording media can be used.

For example, the preferred examples of the recording media include gloss or mat paper such as board paper, cast coated paper, art paper, coated paper, fine coated paper, high-grade paper, copy paper, recycled paper, synthetic paper, wood-containing paper, pressure-sensitive paper, and emboss paper. Special inkjet paper can be also used. Further, resin film and metal deposited film can be also used.

Possible examples of support media which can be used appropriately for coated paper are: a base paper manufactured using a Fourdrinier paper machine, cylindrical-wire paper machine, twin-wire paper machine, or the like, from main components of wood pulp or pigment, the pulp being either a chemical pulp such as LBKP or NBKP, a mechanical pulp, such as GP, PGW, RMP, TMP, CTMP, CMP, CGP, or the like, or recovered paper pulp, such as DIP, and the main components being mixed with one or more additive of a sizing agent, fixing agent, yield enhancer, cationization agent, paper strength enhancer, or the like, or a base paper provided with a size press layer or anchor coating layer formed using starch, polyvinyl alcohol, or the like, or an art paper, coated paper, or cast coated paper, or the like, formed by providing a coating layer on top of the size press layer or anchor coating layer.

In the present embodiment, it is possible to use these base papers or coated papers directly without alteration, and it is also possible to use these papers after carrying out a calendering process using a machine calender, TG calender, soft calender, or the like, and thereby controlling the surface smoothness of the paper.

There are no particular restrictions on the weight of the support medium, although generally the weight is approximately 40 $g/m^2$ to 300 $g/m^2$. The coated paper used in the present embodiment has the coating layer formed on the support medium described above. The coating layer includes a coating composition having a main component of pigment and binder, and at least one layer thereof is formed on the support medium.

For the pigment, it is desirable to use a white pigment. Possible examples of the white pigment are: an inorganic pigment, such as precipitated calcium carbonate, heavy calcium carbonate, magnesium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic non-crystalline silica, colloidal silica, alumina, colloidal alumina, pseudo-boehmite, aluminum hydroxide, lithopone, zeolite, hydrated halloysite, magnesium hydroxide, or the like; or an organic pigment, such as a styrene-based plastic pigment, an acrylic plastic pigment, polyethylene, microcapsules, urea resin, melamine resin, or the like.

Possible examples of the binder are: a starch derivative, such as oxidized starch, etherified starch, or phosophoric acid esterized starch; a cellulose derivative, such as carboxymethyl cellulose, hydroxyethyl cellulose, or the like; casein, gelatine, soybean protein, polyvinyl alcohol, or derivatives of same; polyvinyl alcohols having various degrees of saponification or silanol-denatured versions of same, or carboxylates, cationized products, of other derivatives of same; polyvinyl pyrrolidone, maleic anhydride resin, a styrene-butadiene copolymer, a methyl methacrylate-butadiene copolymer, or other conjugated diene copolymer latex; an acrylic polymer latex, such as a polymer or copolymer of acrylate ester and methacrylate ester; a vinyl polymer latex, such as such as an ethylene acetate vinyl copolymer; or a functional group-denatured polymer latex based on these various polymers and a monomer containing a functional group such as a carboxy group; an aqueous adhesive of a heat-curable synthetic resin, such as melamine resin, urea resin, or the like; an acrylate ester such as polymethylmethacrylate; methacrylate ester polymer or copolymer resin, such as methacrylate ester; or a synthetic resin-based adhesive, such as polyurethane resin, unsaturated polyester resin, vinyl chloride-vinyl acetate copolymer, polyvinyl butylal, alkyd resin, or the like. The combination ratio of the pigment and binder in the coating layer is 3 to 70 parts by weight, and desirably 5 to 50 parts by weight, of binder with respect to 100 parts by weight of pigment. If the combination ratio of the binder with respect to 100 parts by weight of pigment is less than 3 parts by weight, then the coating of the ink receiving layer by the coating composition will have insufficient strength. On the other hand, if the combination ratio is greater than 70 parts by weight, then the absorption of high-boiling-point solvent is slowed dramatically.

Moreover, it is also possible to combine various additives in appropriate fashion in the coating layer, such as: a dye fixing agent, a pigment dispersant, a viscosity raising agent, a fluidity enhancer, an antifoaming agent, a foam suppressant, a separating agent, a foaming agent, a permeating agent, a coloring dye, a coloring pigment, a fluorescent brightener, an ultraviolet light absorber, an antioxidant, an anticorrosive, an antibacterial agent, a waterproofing agent, a wet paper strength enhancer, a dry paper strength enhancer, or the like.

The application amount of the ink receiving layer varies depending on the required luster, the ink absorbing properties and the type of support medium, or the like, and although no general figure can be stated, it is normally 1 g/$m^2$ or greater. Furthermore, the ink receiving layer can also be applied by dividing a certain uniform application amount into two application steps. If application is divided into two steps in this way, then the luster is raised in comparison with a case where the same application amount is applied in one step.

The application of the coating layer can be carried out using one of various types of apparatus, such as a blade coater, roll coater, air knife coater, bar coater, rod blade coater, curtain coater, short dowel coater, size press, or the like, in on-machine or off-machine mode. Furthermore, after application of the coating layer, it is also possible to carry out a smoothing and finishing process on the ink receiving layer by using a calender apparatus, such as a machine calender, a TG calender, a soft calender, or the like. The number of coating layers can be determined appropriately in accordance with requirements.

The coating paper may be an art paper, high-quality coated paper, medium-quality coated paper, high-quality lightweight coated paper, medium-quality lightweight coated paper, or light-coated printing paper; the application amount of the coating layer is around 40 g/$m^2$ on both surfaces in the case of art paper, around 20 g/$m^2$ on both surfaces in the case of high-quality coated paper or medium-quality coated paper, around 15 g/$m^2$ on both surfaces in the case of high-quality lightweight coated paper or medium-quality lightweight coated paper, and 12 g/$m^2$ or less on both surfaces in the case of a light-coated printing paper. An example of an art paper is Tokubishi Art, or the like; an example of a high-quality coated paper is "Urite"; examples of art papers are Tokubishi Art (made by Mitsubishi Paper Mills), Golden Cask Satin (made by Oji Paper), or the like; examples of coated papers are OK Top Coat (made by Oji Paper), Aurora Coat (made by Nippon Paper Group), Recycle Coat T-6 (made by Nippon Paper Group); examples of lightweight coated papers are Urite (made by Nippon Paper Group), New V Matt (made by Mitsubishi Paper Mills), New Age (made by Oji Paper), Recycle Mat T-6 (made by Nippon Paper Group), and "Pism" (made by Nippon Paper Group). Examples of light-coated printing papers are Aurora L (made by Nippon Paper Group) and Kinmari Hi-L (made by Hokuetsu Paper Mills), or the like. Moreover, examples of cast coated papers are: SA Gold Cask plus (made by Oji Paper), Hi-McKinley Art (Gojo Paper Manufacturing), or the like.

As described above, desirably, the heat and pressure fixing temperature is governed by the type of recording medium used.

Practical Examples

The present embodiment of the invention is described in more specific terms below with reference to practical examples, but the present embodiment of the invention is not limited to these examples.

Preparation of Aqueous Ink

The weight-average molecular weight of the resin is measured by gel permeation chromatography (GPC). The GPC was carried out using an HLC-8220 GPC device (made by Tosoh Corp.) and three columns connected in series, a TSK gel Super HZM-H, TSK gel Super HZ 4000, TSK gel Super HZ2000 (all product names of Tosoh Corp.), with an eluent of THF (tetrahydrofuran). Furthermore, the chromatography conditions were: sample density 0.35 percent by weight, flow rate 0.35 ml/min, sample inlet amount 10 μl, and measurement temperature 40° C., and an IR detector was used. Moreover, a calibration curve was created from eight samples manufactured by Tosoh Corp.: "standard sample TSK standard, polystyrene": "F-40", "F-20", "F-4", "F-1", "A-5000", "A-2500", "A-1000", "n-propyl benzene". Unless stated expressly otherwise, the "parts" are standard parts by weight.

Synthesis of Polymer Dispersant P-1

The polymer dispersant P-1 was synthesized as illustrated below in accordance with the following scheme.

(P-1)

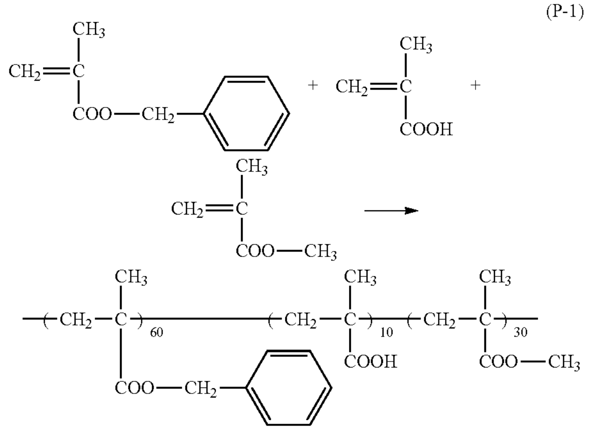

A total of 88 g of methyl ethyl ketone was placed in a three-neck flask with a capacity of 1000 milliliters (ml) equipped with a stirrer and a cooling tube, heating to 72° C. was performed under a nitrogen atmosphere, and then a solution obtained by dissolving 0.85 g of dimethyl 2,2'-azobisisobutyrate, 60 g of benzyl methacrylate, 10 g of methacrylic acid, and 30 g of methyl methacrylate in 50 g of methyl ethyl ketone was dropwise added within 3 hours. Upon completion of dropping, the reaction was conducted for 1 hour, then a solution obtained by dissolving 0.42 g of dimethyl 2,2'-azobisisobutyrate in 2 g of methyl ethyl ketone was added, the temperature was raised to 78° C. and heating was performed for 4 hours. The reaction solution obtained was twice re-precipitated in a large excess amount of hexane, and the precipitated resin was dried to obtain 96 g of the polymer dispersant P-1. The composition of the obtained resin dispersant P-1 was verified by $^1$H-NMR, and the weight-average molecular weight (Mw) found by GPC was 44,600. Further, the acid value was found by a method described in a JIS standard (JIS K0070:1992). The result was 65.2 mg KOH/g.

Preparation of Dispersion C of Resin Coated Pigment Particles 10 parts of Pigment Blue 15:3 (a cyan pigment; phthalocyanine blue A220 made by Dainichiseika Co., Ltd.), 5 parts of the polymer dispersant P-1, 42 parts of methylethyl ketone, 5.5 parts in a 1 normality NaOH aqueous solution, and 87.2 parts of deionized water were mixed together, and dispersed for 2 to 6 hours using 0.1 mm diameter zirconia beads in a beads mill.

The methylethyl ketone was removed from the dispersion thus obtained at 55° C. under vacuum pressure, and a part of the water was also removed, whereupon the dispersion was centrifuged for 30 minutes at 8000 rpm using a 50 ml centrifuge tube in a high-speed centrifuge cooler 7550 (made by Kubota Corp.), and the supernatant liquid apart from the sediment was recovered. Thereupon, the pigment density was determined from the light absorption spectrum, and a dispersion C of resin-coated pigment particles (pigment coated with polymer dispersant) having a pigment density of 10.2 wt % was obtained.

Preparation of Dispersion M of Resin-Coated Pigment Particles

A dispersion M of resin-coated pigment particles (a pigment coated with polymer dispersant) was prepared similarly to the preparation of the dispersion C of resin-coated pigment particles, with the exception that Pigment Red 122 (a magenta pigment) was used instead of Pigment Blue 15:3 (cyan pigment) in the preparation of the dispersion C of resin-coated pigment particles.

Preparation of Dispersion Y of Resin-Coated Pigment Particles

A dispersion Y of resin-coated pigment particles (a pigment coated with polymer dispersant) was prepared similarly to the preparation of the dispersion C of resin-coated pigment particles, with the exception that Pigment Yellow 74 (a yellow pigment) was used instead of Pigment Blue 15:3 (cyan pigment) in the preparation of the dispersion C of resin-coated pigment particles.

Preparation of Dispersion K of Resin-Coated Pigment Particles

A dispersion K of resin-coated pigment particles (a pigment coated with polymer dispersant) was prepared similarly to the preparation of the dispersion C of resin-coated pigment particles, with the exception that carbon black (a black pigment; NIPEX 160-IQ manufactured by Degussa) was used instead of Pigment Blue 15:3 (cyan pigment) in the preparation of the dispersion C of resin-coated pigment particles.

Preparation of Self-Dispersing Polymer Micro-Particles

Synthesis Example 1

560.0 g of methylethyl ketone was introduced into a 2-liter three-mouthed flask equipped with an agitator, a thermometer, a circulation cooling tube, and a nitrogen gas inlet tube, and was heated to a temperature of 87° C. as measured at the exterior of the reaction vessel. A mixed liquid comprising 87.0 g of methyl methacrylate, 406.0 g of "FA-513M" (manufactured by Hitachi Chemical Co., Ltd.), 29.0 g of "PME-100" (manufactured by NOF Corp.), 58.0 g of methacrylic acid, 108 g of methylethyl ketone, and 2.32 g of "V-601" (made by Wako Pure Chemical Industries Co., Ltd.) was added dropwise at a uniform rate so that the dropwise addition was completed in two hours, while maintaining a circulating state inside the reaction vessel. When the dropwise addition was completed, the mixture was agitated for one hour, whereupon (1) a solution comprising 1.16 g of "V-601" and 6.4 g of methylethyl ketone was added and the mixture was agitated for two hours. Subsequently, the step (1) was repeated four times, whereupon a solution comprising 1.16 g of "V-601" and 6.4 g of methylethyl ketone was added, and agitation was continued for 3 hours, thereby yielding a resin solution of a copolymer of methyl methacrylate/FA-513M/PME-100/methacrylic acid (=15/70/5/10 (by weight ratio)). The weight-average molecular weight (Mw) of the copolymer thus obtained was 65,000 (indicated as polystyrene weight by gel permeation chromatography (GPC)), using TSK gel Super HZM-H, TSK gel Super HZ4000, TSK gel Super HZ200 columns manufactured by Tosoh Corp.

Thereupon, 291.5 g of the polymer solution thus obtained (solid content density 44.6%) was weighed out, 82.5 g of isopropanol and 73.92 g of a 1 mol/l aqueous NaOH solution were added, and the internal temperature of the reaction vessel was raised to 87° C. Next, 352 g of distilled water was added dropwise at a rate of 10 ml/min and the water content was dispersed in the mixture. Thereupon, the reaction vessel was maintained at an internal temperature of 87° C. for one hour, 91° C. for one hour and 95° C. for 30 minutes, at atmospheric pressure, whereupon the interior of the reaction vessel was reduced to vacuum pressure, thereby removing a total of 309.4 g of the isopropanol, the methylethyl ketone and the distilled water, and yielding an aqueous dispersion of self-dispersing polymer A-01 having a solid content density of 26.5%.

The $MFT^0$ value of the aqueous dispersion of A-01 thus obtained and the $MFT^{25}$ value of the self-dispersing polymer micro-particles (A-01) were measured. The measurement results are illustrated in FIGS. 5 and 6.

Synthesis Example 2

360.0 g of methyl ethyl ketone was introduced into a 2-liter three-mouthed flask equipped with an agitator, a thermometer, a circulation cooling tube, and a nitrogen gas inlet tube, and was heated to 75° C. To this was added a mixed liquid comprising 180 g of methyl methacrylate, 32.4 g of methoxyethyl acrylate, 126.0 g of benzyl methacrylate, 21.6 g of methacrylic acid, 72 g of methylethyl ketone, and 1.44 g of "V-601" (manufactured by Wako Pure Chemical Industries Co., Ltd.), this mixed liquid being added dropwise at a uniform rate so as to complete dropping over two hours. When the dropwise addition was completed, a solution comprising 0.72 g of "V-601" and 36.0 g of methylethyl ketone was added, agitation was carried out for 2 hours at 75° C. and a solution comprising 0.72 g of "V-601" and 36.0 g of methylethyl ketone was also added and agitation was carried out for two hours at 75° C. Thereupon, agitation was continued for a further two hours at a raised temperature of 85° C., to yield a resin solution of a copolymer of methyl methacrylate/methoxyethyl acrylate/benzyl methacrylate/methacrylic acid (=50/9/35/6 (weight ratio)).

The weight-average molecular weight (Mw) of the copolymer thus obtained was calculated to be 66,000, (when indicated as the molecular weight of polystyrene by gel permeation chromatography (GPC)).

Thereupon, 668.3 g of the resin solution thus obtained was weighed out, 388.3 g of isopropanol and 145.7 ml of a 1 mol/l aqueous NaOH solution were added, and the internal temperature of the reaction vessel was raised to 80° C. Next, 720.1 g of distilled water was added dropwise at a rate of 20 ml/min and the water content was dispersed in the mixture. Thereupon, the reaction vessel was maintained at an internal temperature of 80° C. for 2 hours hour, 85° C. for 2 hours and 90° C. for 2 hours, at atmospheric pressure, whereupon the interior of the reaction vessel was reduced to vacuum pressure, thereby removing a total of 913.7 g of the isopropanol, the methylethyl ketone and the distilled water, and yielding an aqueous dispersion of self-dispersing polymer micro-particles (B-01) having a solid content density of 28.0%.

Synthesis Example 3

A resin solution of a copolymer of methyl methacrylate/FA-513M/PME-100/methacrylic acid (=20/62/10/8 (weight ratio)) and an aqueous dispersion of self-dispersing polymer micro-particles (A-02) having a solid content density of 28.0% were obtained, by a similar method to the synthesis example 1, with the exception that the ratios of the methyl methacrylate, FA-513M, PME-100 and methacrylic acid were changed with respect to the synthesis of the self-dispersing polymer micro-particles (A-01) of the synthesis example 1 described above.

Synthesis Example 4

A resin solution of a copolymer of methyl methacrylate/FA-513M/PME-100/methacrylic acid (=54/35/5/6 (weight ratio)) and an aqueous dispersion of self-dispersing polymer micro-particles (A-03) having a solid content density of 28.0% were obtained, by a similar method to the synthesis example 1, with the exception that the ratios of the methyl methacrylate, FA-513M, PME-100 and methacrylic acid were changed with respect to the synthesis of the self-dispersing polymer micro-particles (A-01) of the synthesis example 1 described above.

Synthesis Example 5

A resin solution of a copolymer of methyl methacrylate/methoxyethyl acrylate/benzyl methacrylate/methacrylic acid (=39/20/35/6 (weight ratio)) and an aqueous dispersion of self-dispersing polymer micro-particles (B-02) having a solid content density of 28.0% were obtained, by a similar method to the synthesis example 1, with the exception that the ratios of the methyl methacrylate, methoxyethyl acrylate, benzyl methacrylate and methacrylic acid were changed with respect to the synthesis of the self-dispersing polymer micro-particles (B-01) of the synthesis example 2 described above.

Synthesis Example 6

A resin solution of a copolymer of methyl methacrylate/methoxyethyl acrylate/benzyl methacrylate/methacrylic acid (=44/15/35/6 (weight ratio)) and an aqueous dispersion of self-dispersing polymer micro-particles (B-03) having a solid content density of 28.0% were obtained, by a similar method to the synthesis example 1, with the exception that the ratios of the methyl methacrylate, methoxyethyl acrylate, benzyl methacrylate and methacrylic acid were changed with respect to the synthesis of the self-dispersing polymer micro-particles (B-01) of the synthesis example 2 described above.

Preparation of Aqueous Ink

Using the dispersions of pigment particles obtained as described above (cyan dispersion C, magenta dispersion M, yellow dispersion Y and black dispersion K) and the dispersion of self-dispersing polymer micro-particles, the respective components were mixed so as to obtain the ink compositions described below, thereby preparing aqueous inks of the respective colors. The aqueous inks thus obtained were filled into plastic disposable syringes and filtered through a polyvinylidene fluoride (PVDF) filter having a hole diameter of 5 μm (a Millex-SV manufactured by Millipore Co., Ltd., having a diameter of 25 mm), thus yielding completed inks Composition of Cyan Ink C-1

Cyan pigment (Pigment Blue 15.3) 4 wt %

The aforementioned polymer dispersant P-1 (solid content): 2 wt %

An aqueous dispersant of the aforementioned self-dispersing polymer micro-particles A-01: 4 wt %

Sannix GP-250 (made by Sanyo Chemical Industries): 10 wt %

Tripropylene glycol monoethyl ether (TPGmMe): 6 wt % (a water-soluble organic solvent manufactured by Wako Pure Chemical Industries Co., Ltd.)

Olefin E1010 (made by Nisshin Chemical Industry Co., Ltd.): 1 wt %

Deionized water: 73 wt %.

The details of solvents apart from the aforementioned which are contained in the inks illustrated in FIGS. 5 and 6 are as follows.

GP400: Sannix GP400 (made by Sanyo Chemical Industries)

TEGmBE: Triethylene glycol monobutyl ether (manufactured by Wako Pure Chemical Industries Co., Ltd.)

Other Compositions of Cyan Ink C

A composition similar to that of cyan ink C-1 was formed, apart from the fact that the aqueous dispersion of self-dispersing polymer micro-particles A-01 and the water-soluble organic solvent in the composition of the ink C-1 were changed to the solvents illustrated in FIGS. 5 and 6.

Composition of Magenta Ink M-1

A composition similar to that of the cyan ink C-1 was formed, apart from the fact that the cyan pigment in the composition of the ink C-1 was changed to magenta pigment (Pigment Red 122) in such a manner that the amount of pigment was equal.

Composition of Yellow Ink Y-1

A composition similar to that of the cyan ink C-1 was formed, apart from the fact that the cyan pigment in the composition of the ink C-1 was changed to yellow pigment (Pigment Yellow 74) in such a manner that the amount of pigment was equal.

Composition of Black Ink K-1

A composition similar to that of the cyan ink C-1 was formed, apart from the fact that the cyan pigment in the composition of the ink C-1 was changed to black pigment (carbon black) in such a manner that the amount of pigment was equal.

Preparation of Treatment Liquid

A treatment liquid was prepared by mixing together respective components to achieve the composition indicated below. The physical values of the treatment liquid were: viscosity 3.8 mPa·s, surface tension 37.5 mN/m, pH (25±1° C.): 1.2.

Malonic acid (a bivalent carboxylic acid, aggregating agent, made by Wako Pure Chemical Industries Co., Ltd.): 25.0 wt %

Sannix GP-250 (hydrophilic organic solvent made by Sanyo Chemical Industries): 20.0 wt %

N-oleoyl-N-sodium methyl taurate (surfactant): 1.0 wt %

Deionized water: 54.0 wt %

In the foregoing, the surface tension is measured by a Wilhelmy method using a platinum plate in an Automatic Surface Tensionometer CBVP-Z (made by Kyowa Interface Science Co., Ltd.), at a temperature of 25° C. The viscosity was measured using a Viscometer V-22 (manufactured by Tokisangyo Co., Ltd.) at 30° C. Furthermore, the pH was measured using a WM-50EG pH meter manufactured by To a DKK (Co., Ltd.), at 25° C.±1° C., using the aqueous ink directly.

Image Recording and Evaluation

Image recording was carried out using the inkjet recording apparatus illustrated in FIG. 1 and the ink and treatment liquid described above. For the recording medium, high-grade coated paper (Shiraoi) and coated paper (Tokubishi Art) having a coating layer containing micro-particles in a hydrophilic binder formed on both surfaces of the paper, were used. Roller offset, wear resistance and blocking were evaluated with respect to the fixing temperature when the image formed by various inks was fixed (namely, the temperature of the recording medium upon arrival at fixing).

Roller Offset

A solid image was recorded with cyan pigment ink C and the solid image after fixing and the ink offset to the surface of the fixing roller were evaluated visually according to the following criteria, by a tape peeling process.

A: No transfer to the fixing roller at all.

B: Slight transfer to the fixing roller was observed, but not conspicuous in the solid image and of a tolerable level in practical terms.

C: Marked transfer to the fixing roller, of a level which is problematic in practical terms.

Wear Resistance

Immediately after printing a 2 cm square solid portion on a recording medium on which a solid image of cyan pigment ink C had been recorded, a sheet of recording medium which had not been recorded (the same type of recording medium as that used for recording (called "unused sample" in the present evaluation)) was placed thereon, a weight of 200 kg/m$^2$ was applied, and the unused sample was rubbed back and forth ten times. The amount of transfer of ink to the blank portion of the unused sample was observed visually and evaluated in accordance with the following criteria.

A: There was no transfer of ink at all.

B: Slight transfer of ink observed, but of a tolerable level in practical terms.

C: Marked transfer of ink, of a level which is problematic in practical terms.

Resistance to Blocking

A uniform image portion formed by solid recording of cyan pigment ink C onto a solid image of magenta pigment ink M was cut to a size of 3.5 cm×4 cm, and this evaluation sample was placed with the printed surface upwards on a 10 cm×10 cm acrylic sheet. Moreover, a similarly printed sample was placed on top of this evaluation sample, with the image portions mutually superimposed, and another 10 cm×10 cm acrylic sheet was placed thereon and left for 10 hours at 60° C. and 40% RH. After this time, a 1 kg weight was placed on the uppermost acrylic sheet and left for a further 24 hours (corresponding to an applied weight of 700 kg/m$^2$). After storing for a further two hours at 25° C. and 50% RH, the evaluation sample was peeled away. The ease with which the sample could be peeled away, and the color transfer after peeling were observed visually and assessed according to the following criteria.

A: Peeled away naturally and no color transfer between the two samples observed.

B: Some sticking occurred and some degree of color transfer between the samples was observed, but within tolerable limits in practical terms.

C: Strong sticking and significant color transfer between samples, of a problematic level in practical terms.

The results when using high-grade paper as the recording medium are illustrated in FIGS. 5A and 5B (recording medium: high-grade paper (shiraoi)); and the results when using coated paper are illustrated in FIGS. 6A and 6B (recording medium: coated paper (tokubishi art)). In FIGS. 5A, 5B, 6A and 6B, the figures within the parenthesis in the organic solvents indicate the weight % included in the ink. In the experimental examples 1-1 to 11-1 using high-grade paper as the recording medium, when fixing the image formed on the high-grade paper, it was possible to form an image having good wear resistance and resistance to blocking, without the occurrence of roller offset, by fixing at a fixing temperature T in the range of $MFT^{25} \leqq T \leqq MFT^{25}+50$ (° C.). On the other hand, in the experimental example 12 using resin particles having an $MFT^{0}$ value of 60° C. or lower, it was not possible to achieve resistance to blocking.

In the experimental examples 1-2 to 11-2 using coated paper as the recording medium, when fixing the image formed on the high-grade paper, it was possible to form an image having good wear resistance and resistance to blocking, without the occurrence of roller offset, by fixing at a fixing temperature T in the range of $MFT^{25} \leqq T \leqq MFT^{25}+50$ (° C.), and no more than 100° C.

When using coated paper, if the fixing temperature exceeded 100° C., the water content in the coated paper evaporated suddenly, damaging the image portion and the coating layer of the paper, and therefore decline in roller offset and wear resistance were observed.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus, comprising:

a printing device which forms an image on a recording medium using ink containing at least pigment, a water-soluble organic solvent, resin particles and water; and a fixing device which makes contact with a surface of the recording medium on which the image is formed and applies heat and pressure to fix the image, wherein a minimum filming temperature ($MFT^0$) of an aqueous dispersion of the resin particles is 60° C. or above, and higher than a minimum filming temperature ($MFT^{25}$) of a dispersion of the resin particles in a mixed liquid combining a water-soluble organic solvent at 25 weight % with respect to the resin particles, and water; and wherein the image forming apparatus further comprises a controller which controls temperature of the recording medium in such a manner that, when the temperature of the recording medium in the fixing device is represented by T, the minimum filming temperature ($MFT^{25}$) of mixed liquid dispersion of the resin particles satisfies $MFT^{25} \leqq T \leqq MFT^{25}+50$ (° C.), and a coating layer is formed on the recording medium, then the temperature of the recording medium is adjusted to or below a temperature at which a coating layer is not broken down.

2. The image forming apparatus as defined in claim 1, wherein:

the recording medium is a coated paper having a coating layer containing micro-particles in a hydrophilic binder on at least one surface of the paper; and the controller controls the temperature of the recording medium in such a manner that the temperature T of the recording medium in the fixing device satisfies $T<100$ (° C.).

3. The image forming apparatus as defined in claim 1, wherein the printing device uses droplet ejection by an inkjet.

4. The image forming apparatus as defined in claim 1, further comprising a drying device which dries the ink, on a downstream side of the printing device in terms of a direction of conveyance of the recording medium.

5. The image forming apparatus as defined in claim 4, further comprising a water content measurement device which measures a water content of the ink ejected as droplets onto the recording medium, on a downstream side of the drying device in terms of the direction of conveyance of the recording medium, wherein the controller adjusts heating temperature in accordance with the water content.

6. The image forming apparatus as defined in claim 1, further comprising:

a treatment liquid deposition device which deposits treatment liquid containing a component that reacts with the pigment contained in the ink, onto the recording medium on an upstream side of the printing device in terms of the direction of conveyance of the recording medium; and a treatment liquid drying device which dries a solvent of the treatment liquid which has been deposited onto the recording medium.

7. The image forming apparatus as defined in claim 1, wherein a content of the water-soluble organic solvent is equal to or greater than 5 wt % and equal to or less than 30 wt % in the ink.

8. The image forming apparatus as defined in claim 1, wherein the water-soluble organic solvent is one type selected from alkylene oxy alcohol and alkylene oxyalkyl ether.

9. The image forming apparatus as defined in claim 1, wherein a vapor pressure of the water-soluble organic solvent is lower than a vapor pressure of water.

10. The image forming apparatus as defined in claim 1, wherein the minimum filming temperature ($MFT^{25}$) of the mixed liquid dispersion of the resin particles satisfies $MFT^{25}+10$ (° C.)$\leqq T \leqq MFT^{25}+30$ (° C.).

11. The image forming apparatus as defined in claim 1, wherein the minimum filming temperature ($MFT^{25}$) of the mixed liquid dispersion of the resin particles and the minimum filming temperature ($MFT^0$) of the aqueous dispersion of the resin particles satisfy 50 (° C.)$\leqq(MFT^0-MFT^{25})$.

12. An image forming method, comprising:

an ink printing step of forming an image on a recording medium, using ink containing at least pigment, a water-soluble organic solvent, resin particles and water; and a fixing step of making contact with a surface of the recording medium on which the image is formed and applies heat and pressure to fix the image, wherein a minimum filming temperature ($MFT^0$) of an aqueous dispersion of the resin particles is 60° C. or above, and higher than a minimum filming temperature ($MFT^{25}$) of a dispersion of the resin particles in a mixed liquid combining a water-soluble organic solvent at 25 weight % with respect to the resin particles, and water; and temperature of the recording medium is controlled in such a manner that, when the temperature of the recording medium in the fixing device is represented by T, the minimum filming temperature ($MFT^{25}$) of mixed liquid dispersion of the resin particles satisfies $MFT^{25} \leqq T \leqq MFT^{25}+50$ (° C.), and a coating layer is formed on the recording medium, then the temperature of the recording medium is adjusted to or below a temperature at which a coating layer is not broken down.

13. The image forming method as defined in claim 12, wherein the recording medium is a coated paper having a coating layer containing micro-particles in a hydrophilic binder on at least one surface of the paper; and the temperature of the recording medium is controlled in such a manner that the temperature T of the recording medium in the fixing step satisfies $T<100$ (° C.).

14. The image forming method as defined in claim 12, wherein the printing step uses droplet ejection by an inkjet.

15. The image forming method as defined in claim 12, comprising a drying step of drying the ink after the printing step.

16. The image forming method as defined in claim 15, comprising a water content measurement step of measuring a water content of the ink ejected as droplets onto the recording medium after the drying step, wherein heating temperature in the fixing step is controlled in accordance with the water content.

17. The image forming method as defined in claim 12, further comprising:

a treatment liquid deposition step of depositing treatment liquid containing a component that reacts with the pigment contained in the ink, onto the recording medium, before the printing step; and a treatment liquid drying step of drying a solvent in the treatment liquid which has been deposited onto the recording medium.

18. The image forming method as defined in claim 12, wherein the minimum filming temperature ($MFT^{25}$) of the mixed liquid dispersion of the resin particles satisfies $MFT^{25}+10$ (° C.)$\leqq T \leqq MFT^{25}+30$ (° C.).

19. The image forming method as defined in claim 12, wherein the minimum filming temperature ($MFT^{25}$) of the mixed liquid dispersion of the resin particles and the minimum filming temperature ($MFT^{0}$) of the aqueous dispersion of the resin particles satisfy 50 (° C.)$\leqq(MFT^{0}-MFT^{25})$.

* * * * *